United States Patent
Labský et al.

(10) Patent No.: US 9,911,412 B2
(45) Date of Patent: Mar. 6, 2018

(54) EVIDENCE-BASED NATURAL LANGUAGE INPUT RECOGNITION

(71) Applicant: Nuance Communications, Inc., Burlington, MA (US)

(72) Inventors: Martin Labský, Prague (CZ); Ladislav Kunc, Hlusice (CZ); Jan Kleindienst, Nove Straseci (CZ); Tomás Macek, Zizkov (CZ); Bart D'hoore, Aalter (BE)

(73) Assignee: Nuance Communications, Inc., Burlington, MA (US)

( * ) Notice: Subject to any disclaimer, the term of this patent is extended or adjusted under 35 U.S.C. 154(b) by 285 days.

(21) Appl. No.: 14/640,833

(22) Filed: Mar. 6, 2015

(65) Prior Publication Data

US 2016/0259779 A1   Sep. 8, 2016

(51) Int. Cl.
*G06F 17/20* (2006.01)
*G06F 17/21* (2006.01)
*G10L 15/26* (2006.01)
*G10L 21/00* (2013.01)
*G10L 15/18* (2013.01)
*G06F 17/27* (2006.01)

(52) U.S. Cl.
CPC ............ *G10L 15/18* (2013.01); *G06F 17/279* (2013.01)

(58) Field of Classification Search
None
See application file for complete search history.

(56) References Cited

U.S. PATENT DOCUMENTS

| | | | | |
|---|---|---|---|---|
| 6,128,596 A | * | 10/2000 | Mackie | ............... G10L 15/18 704/256 |
| 6,272,455 B1 | * | 8/2001 | Hoshen | ............... G10L 15/1822 704/1 |
| 6,879,950 B1 | * | 4/2005 | Mackie | ............... G10L 15/1815 704/10 |

(Continued)

OTHER PUBLICATIONS

"Information Extraction from Websites using Extraction Ontologies." Labsky, Martin. University of Economics Prague. Department of Knowledge Engineering. Apr. 2009.

*Primary Examiner* — Satwant Singh
(74) *Attorney, Agent, or Firm* — Brian J. Colandreo; Michael T. Abramson; Holland & Knight LLP

(57) ABSTRACT

Methods, devices, and computer program products for recognizing and responding to natural language input are described herein. Natural language input is received at a natural language input interface of a computing device and transformed into computer-usable text. A natural language input recognizer obtains evidence from one or more evidence source and generates an evidence graph based on the evidence obtained. Evidence may be obtained asynchronously, and the natural language input recognizer may update the evidence graph upon receipt of additional evidence. The natural language input recognizer generates a set of recognition hypotheses based on the evidence graph and selects one of the recognition hypotheses as a recognition result for the natural language input. Semantic models, evidence models, and response models may be employed to generate the evidence graph and respond to the recognition result selected for the natural language input.

37 Claims, 10 Drawing Sheets

(56) References Cited

U.S. PATENT DOCUMENTS

| | | | | |
|---|---|---|---|---|
| 7,398,201 | B2* | 7/2008 | Marchisio | G06F 17/271 704/9 |
| 7,487,095 | B2* | 2/2009 | Hill | G10L 15/1822 704/275 |
| 7,606,714 | B2* | 10/2009 | Williams | G10L 13/027 379/265.02 |
| 8,000,973 | B2* | 8/2011 | Williams | G10L 13/027 704/275 |
| 9,384,736 | B2* | 7/2016 | Labsky | G10L 15/30 |
| 9,536,049 | B2* | 1/2017 | Brown | G06F 19/345 |
| 2009/0030697 | A1 | 1/2009 | Cerra et al. | |
| 2014/0058732 | A1 | 2/2014 | Labsky et al. | |
| 2017/0270921 | A1* | 9/2017 | Arslan | G10L 15/22 |

* cited by examiner

```
<intent id="query" prior="0.01">
    <evidence>
        <!-- match interpretation of results from local ASR -->
        <pat id="grm_query" ctx="asr.local" intent="query" p="conf" r="0.2" />

<!-- match regex against remote ASR hypotheses -->
        <pat id="regex_query1" ctx="asr.remote" p="0.75 * conf">
            /search (encyclopedia|dictionary)( for|)(( \w+|){1,10}/i
        </pat>

<pat id="regex_query2" ctx="asr.remote" p="0.5 * conf">
            /(tell|show|find)( me|us|)( something|)( about|)(( \w+|){1,10}/i
        </pat>

<state id="app_state" value="search" p="0.2">
    </evidence>
    <slot id="topic" card="0-1">
        <evidence>
            <!-- refer to the named entity above matching the regex pattern -->
            <pat ref="regex_query1" value="$3" p="conf" />

<pat ref="regex_query2" value="$5" p="conf" />

<!-- match whole phrase with lower probability -->
            <pat id="plain_query" ctx="asr.remote" value="$1" p="conf * 0.5">
                ^(.+)$
            </pat>
        </evidence>
    </slot>
</intent>
```

```
702 ┌─────────────────────────────────────────────────────────┐
    │<intent id="name" prior="0.01">                          │
704 │  <react>                                                │
712 │    <case src="asr.local, asr.remote" min_conf="0.7" />  │
710 │    <act_group>                                          │
714 │      <announce>                                         │
    │        <text mode="audio, hint">Hello $name!</text>     │
    │      </announce>                                        │
716 │      <announce>                                         │
    │        <text mode="audio, hint">Nice to meet you $name.</text>│
    │      </announce>                                        │
    │    </act_group>                                         │
    │  </react>                                               │
706 │  <evidence>                                             │
718 │    <pat ctx="asr.local" intent="name" p="conf" />       │
720 │    <pat id="remote_name" ctx="asr.remote" p="conf">     │
    │      /^my name is(( \w+|){1,3})$/i                      │
    │    </pat>                                               │
    │  </evidence>                                            │
708 │  <slot id="name" card="0-1">                            │
722 │    <evidence>                                           │
724 │      <pat ref="remote_name" slotvalue="$1" p="conf" />  │
    │    </evidence>                                          │
    │  </slot>                                                │
    │</intent>                                                │
    └─────────────────────────────────────────────────────────┘
```

EVIDENCE-BASED NATURAL LANGUAGE INPUT RECOGNITION

TECHNICAL FIELD

The present application generally relates to the recognition of natural language input and relates, in particular, to an automated, evidence-based approach for recognizing natural language input.

BACKGROUND

When processing natural language input, it can be advantageous to utilize multiple recognition engines, each with their specific strengths, such as having short latency, being specialized in a specific domain or capable of handling generic topics. Approaches that do utilize multiple recognition engines, however, often face three main challenges.

The first challenge is the uncertainty of the recognition hypotheses respectively provided by multiple recognition engines. Individual recognition hypotheses are often associated with a level of confidence in the hypothesis, i.e., the likelihood that the hypothesis is correct. While selecting between recognition hypotheses having high and low confidences might be relatively straightforward, selecting between recognition hypotheses having similar confidences might be relatively more difficult.

The second challenge is the latency associated with the recognition hypotheses provided by different recognition engines. Where multiple recognition engines are employed to process the natural language input, the respective recognition hypotheses might be received from the recognition engines asynchronously, i.e., at different times. Some recognition engines might provide recognition hypotheses with relatively low latency, but those recognition hypotheses might have relatively lower probabilities. Other recognition engines might provide more reliable recognition hypotheses but with relatively higher latency. As a result, selecting between faster but relatively less reliable recognition hypotheses or delayed but relatively more reliable recognition hypotheses can also be difficult.

The third challenge is the selection of a final recognition result from multiple recognition hypotheses that have been generated. The confidence associated with a recognition hypothesis is but one factor that might be considered when selecting a final recognition result. Other factors, such as the context in which the natural language input is received, might also suggest whether one recognition hypothesis is more likely to be accurate relative to another recognition hypothesis. Integrating multiple factors to select a final recognition result, however, can also present difficulties.

In view of the challenges discussed above, a need exists for an approach to recognizing natural language input that can arbitrate between competing recognition hypotheses and that can consider the context in which that natural language input is provided.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

To overcome the challenges discussed above, and to overcome other challenges that will be apparent upon reading and understanding the present specification, aspects described herein are directed towards evidence-based natural language input recognition processes as well as systems, apparatuses, and devices configured to perform such processes. Using one or more aspects described herein, a system transforms natural language input into recognized text for use, e.g., by a software application. As one example, audio received through a microphone (e.g., human speech) is transformed into computer-usable input.

A first aspect described herein provides a method of recognizing natural language input. Natural language input is received at a natural language input interface of a computing device. A natural language input recognizer obtains evidence from an evidence source and generates an evidence graph based, at least in part, on the evidence obtained. The natural language input recognizer generates a set of recognition hypotheses based, at least in part, on the evidence graph and selects one of the recognition hypotheses as a recognition result for the natural language input.

A second aspect described herein provides a device configured to recognize natural language input. The device, according to this aspect, includes a natural language input interface that is configured to receive natural language input and generate a digital signal corresponding to the natural language input received. The device also includes a natural language input recognizer configured to obtain evidence from an evidence source and generate an evidence graph based, at least in part, on the evidence obtained. The natural language input recognizer is further configured to generate a set of recognition hypotheses based, at least in part, on the evidence graph, and select one of the recognition hypotheses as a recognition result for the natural language input received.

A third aspect described herein provides a computing program product that includes a non-transitory computer-readable medium having instructions stored therein. When executed, the instructions cause the computing device to perform steps for recognizing natural language input. The computing device, according to this aspect, receives natural language input and asynchronously obtains evidence from multiple evidence sources. The computing device generates an evidence graph based on the evidence obtained, and the evidence graph includes intent evidence nodes interconnected with phrase evidence nodes. The computing device traverses the evidence graph to generate, for a first timeframe, recognition hypotheses based on evidence obtained during that first timeframe. The computing device also traverses the evidence graph to generate, for a second timeframe, another set of recognition hypotheses based on evidence obtained during that second timeframe. The computing device scores each of the recognition hypotheses and selects one of the recognition hypotheses as the recognition result for the natural language input received. The computing device then triggers a response associated with the recognition result selected for the natural language input received.

These and additional aspects will be appreciated with the benefit of the disclosures discussed in further detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein:

FIG. 3A depicts a portion of an example of an implementation of an arbitration model in accordance with illustrative aspects described herein.

FIG. 7 depicts an example of an implementation of a user interface response model in accordance with illustrative aspects described herein.

DETAILED DESCRIPTION

Figure 1:
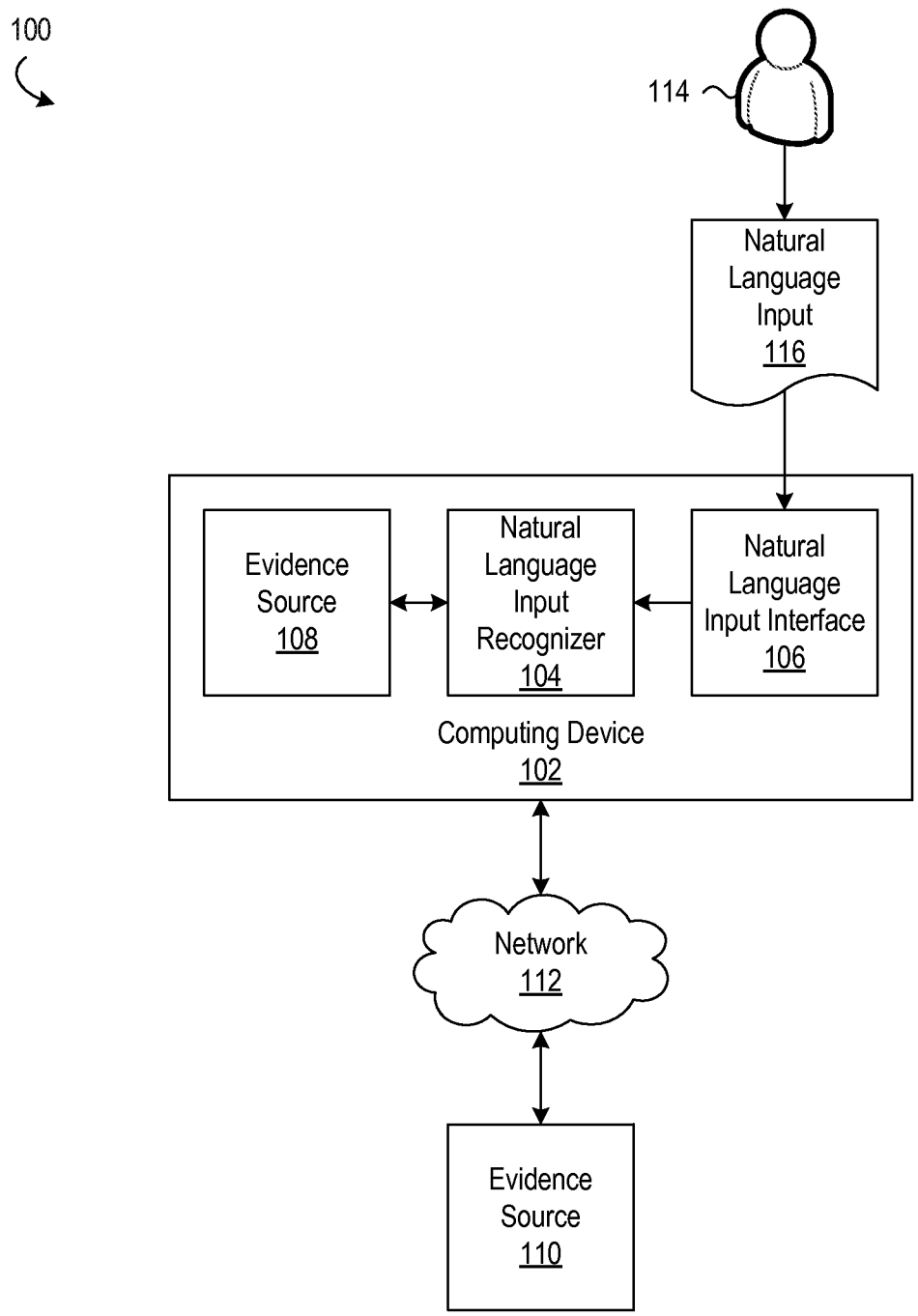
FIG. 1 depicts an example of an implementation of a system for evidence-based natural language input recognition in accordance with illustrative aspects described herein.

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

As a general introduction to the subject matter described in more detail below, aspects described herein are directed toward evidence-based natural language input recognition. The techniques described in further detail below advantageously address the challenges to natural language input recognition identified above. A natural language input recognizer integrates multiple pieces of evidence obtained from various evidence sources to determine which one of competing output recognition hypotheses should be selected as the final recognition result for natural language input received. An output recognition hypothesis refers to a proposed recognition that may be selected from a pool of proposed recognitions as the final recognition result for the natural language input received. The natural language input recognizer maintains an evidence graph that is traversed to generate a set of output recognition hypotheses, one of which is ultimately selected as the final recognition result for the natural language input. As evidence is obtained, the natural language input recognizer updates the evidence graph, updates the set of output recognition hypotheses, and scores the output recognition hypotheses. The scores for the output recognition hypotheses may depend on the evidence obtained thus leveraging the context in which the natural language input is received.

Generally speaking, an output recognition hypothesis that is supported by evidence is more likely to be accurate than an output recognition hypothesis that is not supported by evidence. Furthermore some evidence might be stronger than other evidence. Accordingly an output recognition hypothesis supported by relatively strong evidence is more likely to be accurate than an output recognition hypothesis supported by evidence that is not as strong. The techniques for natural language input recognition described herein thus advantageously improve the accuracy of the recognition results generated for received natural language input. These techniques may be implemented at individual computing devices and at systems of interconnected computing devices. These techniques may also be implemented in various environments and contexts which will be appreciated with the benefit of this disclosure.

As noted above, it can be advantageous to utilize multiple recognition engines when processing natural language input. Processing the natural language input may include recognizing the input itself and interpreting its semantic meaning. As an example, an automatic speech recognition (ASR) engine may operate to convert speech audio to transcribed text, and a natural language understanding engine (NLU) may operate to interpret the transcribed text and apply semantic labels to portions of the transcribed text. Semantic labels may also be referred to as annotations, and applying semantic labels to portions of transcription text may be referred to as annotating the transcription text. In another example, natural language input recognition in embedded environments (e.g., automotive and mobile computing environments) may utilize both local and remote recognition engines. In these example implementations, the local recognition engine may be utilized where relatively faster recognition results are preferred, and/or local evidence sources are available, while the remote recognition engine may be utilized where more relatively reliable recognition results are preferred and/or more up-to-date evidence sources are available. In a further example, multiple recognition engines may be utilized to handle different aspects of the recognition process. A generic NLU engine may be utilized to label standard location names (e.g., cities, states, countries) that appear in transcribed text while a customized NLU engine may be utilized to label commands associated with specific applications (e.g., weather forecasts, flight reservations) that appear in the transcribed text. Utilizing both generic and customized recognition engines advantageously permits re-use of existing recognition engines for new applications. The existing generic recognition engines may be utilized in conjunction with new custom recognition engines having application-specific grammars and application-specific parsing rules.

As noted above, however, utilizing multiple recognition engines introduces challenges in the recognition process. Output recognition hypotheses having varying levels of confidence may be received from different recognition asynchronously, and a final recognition result must be selected from competing output recognition hypotheses. Systems, devices, and software applications are often controllable via natural language input that has been transformed into recognized text, and the final recognition result may be utilized to trigger some action or response. Successful operation of those systems, devices, and software applications thus depends on accurately interpreting the natural language input received such that the correct action is taken or such that the correct response is provided. By improving the accuracy of the recognition results provided, the techniques for natural language input recognition thus also advantageously improve the operation of systems, devices, and software applications that are controllable or otherwise operable using natural language.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging. In addition a "set" as used in this description refers to a collection of one or more elements. Furthermore non-transitory computer-readable media refer to all types of computer-readable media with the sole exception being a transitory propagating signal.

Referring now to FIG. 1, an example of an implementation of a system 100 for evidence-based natural language input recognition is shown. The system 100, in this example, includes a computing device 102 that includes a natural language input recognizer 104, a natural language input interface 106, and a local evidence source 108. The natural language input recognizer 104 is in signal communication with the natural language input interface 106 and with the local evidence source 108. The natural language input recognizer 104 is also in signal communication with a remote evidence source 110 via a network 112. As seen in FIG. 1, the natural language input interface 106 receives from a user 114 natural language input 116.

The natural language input 116 may be any form of natural language including speech, typed text, handwritten text, and manual gestures. Accordingly, where the natural language input 116 is speech, the natural language input interface may be a speech input interface that includes a microphone that generates an analog signal corresponding to the speech input received from a user and an analog-to-digital converter that converts the analog signal to a digital signal corresponding to the speech input. Where the natural language input 116 is typed text, the natural language input interface 106 may be a text input interface such as a physical keypad or keyboard, a touchscreen displaying a virtual keypad or keyboard, and other types of input means that allow selection of individual characters or words and generates a digital signal corresponding to those characters or words. Where the natural language input 116 is handwritten input, the natural language input interface 106 may include a touchscreen that receives strokes of a finger, stylus, or digital pen and an interpreter that converts those strokes into a digital signal representing individual characters or words. Where the typed input or handwritten input is applied to a physical document, the natural language input interface 106 may include an image input device (such as a camera or scanner) that generates a digital image of the document and an interpreter that utilizes optical character recognition (OCR) technology to recognize individual characters or words in the digital image. Where the natural language is a signed language, the user 114 may provide the natural language input as manual gestures. Where the natural language input 116 includes manual gestures, the natural language input interface 106 may include an image input device (such as a camera) that generates digital images of the gestures and an interpreter that processes the digital images of the gestures to recognize individual characters or words. Although the computing device 102 shown in FIG. 1 includes a single natural language input interface 106, it will be appreciated that other implementations may employ multiple natural language input interfaces configured to receive different types of natural language input. As an example, a computing device may include three natural language input interfaces each respectively configured to receive natural language input as speech, typed text, and handwritten text.

The evidence sources 108 and 110 provide evidence to the natural language input recognizer 104. As used in this description, evidence refers to any information that can be utilized to bias the selection of an output recognition hypothesis as a final recognition result for the natural language input 116. An evidence source may initiate transmission of an event notification to the natural language input recognizer 104. The event notification may include the evidence that the natural language input recognizer utilizes in evaluating the output recognition hypotheses for the natural language input 116. The natural language input recognizer 104 may additionally or alternatively query the evidence sources 108 and 110 requesting evidence. In response to receipt of the request, an evidence source may provide a response that contains the evidence requested. As described in further detail below, the natural language input recognizer 104 maintains an evidence graph used to generate a set of output recognition hypotheses based on the evidence obtained and selects a final recognition result for the natural language input 116 from the set of output recognition hypotheses based on that evidence.

Since evidence may be any information that biases the selection of one output recognition hypothesis over another output recognition hypothesis, various types of evidence sources may provide such evidence. In the present disclosure, evidence includes recognition hypotheses provided by recognition engines. Accordingly an ASR engine is one type of evidence source, and the transcription recognition hypotheses provided by that ASR engine are one type of evidence. Likewise an NLU engine is another type of evidence source, and the semantic recognition hypotheses provided by that NLU engine are another type of evidence.

Briefly, the following description provides an example of the recognition hypotheses provided by ASR engines and NLU engines. As noted above, an ASR engine may generate one or more recognition hypotheses when processing a speech signal encoding input speech. The recognition hypothesis provided by an ASR engine includes a transcription of the speech encoded by the speech signal and may thus be referred to as a transcription recognition hypothesis. An OCR engine may similarly provide a transcription of typed text or handwriting encoded in an image. Examples of two transcription recognition hypotheses an ASR engine might generate from a speech signal include: "I want to fly to Paris." and "I want to fly to Polish." As also noted above, an NLU engine may generate one or more recognition hypotheses when processing text such as the transcription included in a transcription recognition hypothesis. The NLU engine may apply semantic labels to portions of the text. Accordingly the recognition hypotheses provided by an NLU engine may be referred to as semantic recognition hypotheses. Using the examples above, an NLU engine may apply semantic labels to the transcription recognition hypotheses to obtain the following semantic recognition hypotheses: "I [intent] want to fly to [/intent] [location] Paris [/location]." and "I [intent] want to fly to [/intent] [location]

Polish [/location]." As seen in these examples, the NLU engine identifies an intent of the individual and corresponding information associated with that intent. Parameters associated with an intent are referred to in this description as slots which each have a slot identifier (e.g., location) and a slot value (e.g., "Paris" and "Polish"). One of the semantic recognition hypotheses may be selected as the final recognition result for the input speech. An application may extract the semantic labels and their corresponding values to trigger some action or provide some response. Continuing the example above, the former semantic recognition result may be selected as the final recognition result, and a flight booking application may search flights to Paris in response to receipt of the input speech. Other examples will be appreciated with the benefit of this disclosure.

Recognition hypotheses from recognition engines, however, are but one type of evidence that may bias the selection of a final recognition result. Other examples of evidence include: a) user context information such as the identity of the user, demographic or biographic data associated with the user, the current relative or physical location of the user, and other information associated with the user that provided the natural language input; b) environmental context information such as the current date, the current time of day, current or historical weather conditions, current or historical traffic conditions, relative position to another location or point-of-interest, and other information associated with the environment in which the natural language input is received; c) system or device state information such as the status of sensors or monitoring units, warnings or feedback provided, flags set, information stored in memory, and other types of information associated with the status of a system or device; d) program state information such as the current program that has focus at a computing device, a list of programs currently running at a computing device, the current screen displayed at a program, the most recent action performed at a program, a usage history associated with a program, and other information associated with programs. In view of the different types of evidence that may bias selection of the final recognition result, examples of evidence sources include: clocks, timers, calendars, Global Position System (GPS) modules and devices, light sensors, sound sensors, pressure sensors, image input devices, sound input devices, accelerometers, receivers, transmitters, transceivers, information databases, computer memory, weather information systems, traffic information systems, navigation systems, warning lights, programs including firmware and software applications, menu or button selection histories, link selection histories, and the like. Additional examples of evidence and evidence sources will be appreciated with the benefit of this disclosure.

Furthermore evidence sources may reside at the same computing device or the same system (e.g., an embedded system) as a natural language input recognizer and may also reside remotely relative to the natural language input recognizer. As shown by way of example in FIG. 1, the natural language input recognizer 104 is in signal communication with both a local evidence source 108 and a remote evidence source 110. The natural language input recognizer 104 communicates with the remote evidence source 110 via the network 112. The network 112 may include one or more networks such as a local area network (LAN) and wide area network (WAN) such as the Internet. Such networks may include wired networks and wireless networks such as WiFi and cellular networks. The network 112 may also include other types of networks having varying spatial scope such as, e.g., body area networks, personal area networks, "near-me" area networks, campus area networks, metropolitan area networks, and the like.

The computing device 102 at which the natural language input recognizer 104 and natural language input interface 106 reside may be one of many types of computing devices. Examples include desktop computing devices, laptop computing devices, tablet computing devices, palmtop computing devices, televisions, television set-top boxes, video game machines, electronic tools, electronic appliances, system and device controllers, and other types of computing devices that are controllable or otherwise operable based on natural language input received. As noted above, the natural language input recognizer described herein advantageously improves the accuracy of the final recognition results for the natural language input received at these computing devices. The computing device 102 having the natural language input recognizer 104 may also be embedded into other systems. As one example, the computing device 102 with the natural language input recognizer 104 may be embedded into a vehicle system thus allowing a driver to issue commands to the vehicle and request input from the vehicle using natural language input such as speech. Additional examples will be appreciated with the benefit of this disclosure.

Figure 2:
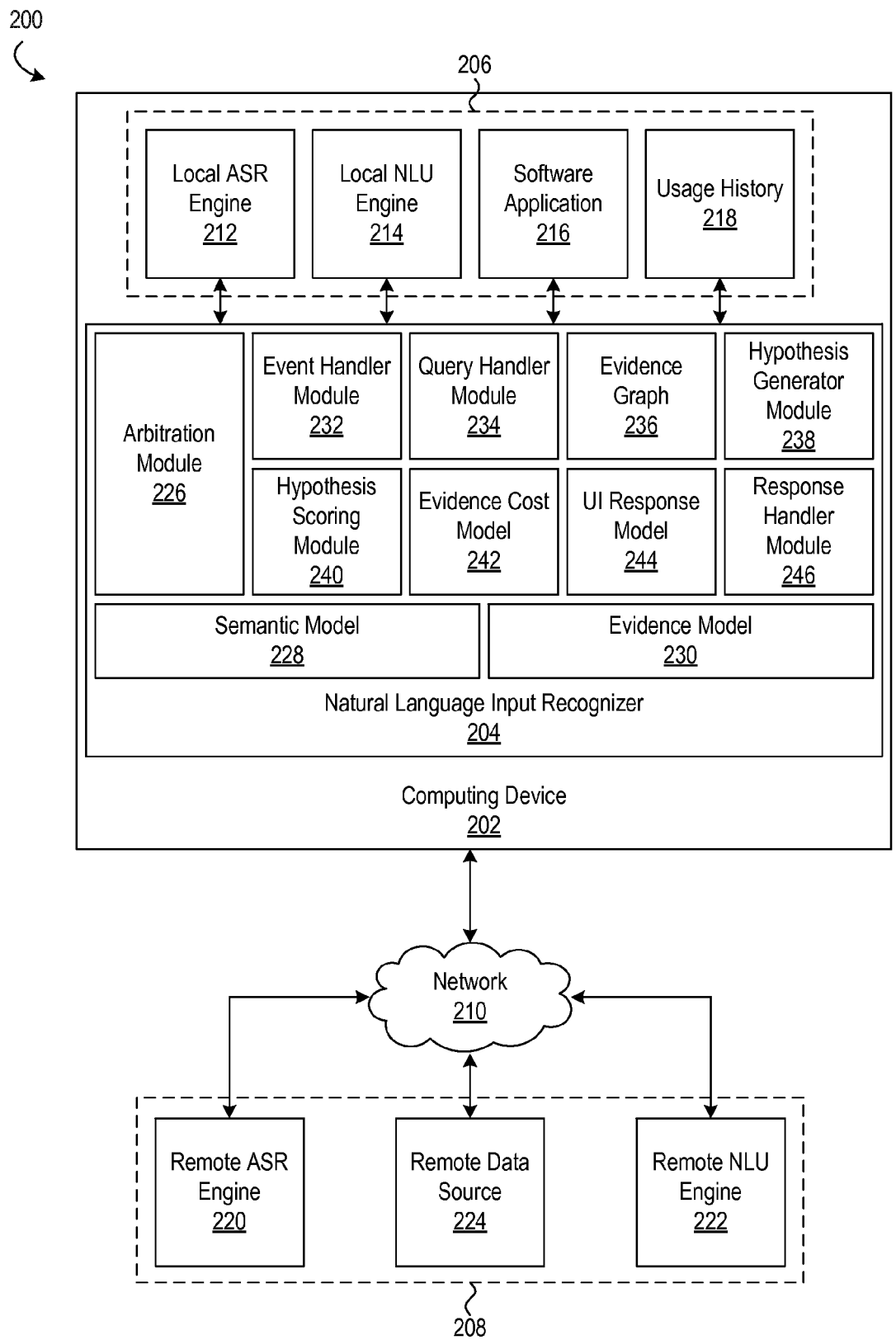
FIG. 2 depicts another example of an implementation of a system for evidence-based natural language input recognition in accordance with illustrative aspects described herein.

Referring now to FIG. 2, another example of an implementation of a system 200 for evidence-based natural language input recognition is shown. The system 200 in FIG. 2 is similar to the system 100 depicted in FIG. 1. Like the system 100 of FIG. 1, the system 200 in FIG. 2 includes a computing device 202 at which resides a natural language input recognizer 204. The computing device 202 may be the same as or at least similar to the computing device 102 described with reference to FIG. 1 above. Similarly, the natural language input recognizer 204 may be the same as or at least similar to the natural language input recognizer 104 also described with reference to FIG. 1 above. The natural language input recognizer 204, in this example, is in signal communication with a set of local evidence sources 206 and with a set of remote evidence sources 208 via a network 210. The set of local evidence sources 206, in this example, includes a local ASR engine 212, a local NLU engine 214, a local software application 216, and a local usage history 218. The local software application 216 may be, for example, a web browser, and the local usage history 218 may thus be a web browsing history. The set of remote evidence sources 208, in this example, includes a remote ASR engine 220, a remote NLU engine 22, and a remote data source 224. The remote data source 224 may be, for example, a freely-accessible online encyclopedia that provides articles in response to topic queries.

The natural language input recognizer 204 includes various modules and components that facilitate recognition of natural language input based on evidence that is asynchronously received. In this example, the natural language input recognizer 204 includes an arbitration module 226 as well as a semantic model 228 and an evidence model 230 utilized by the arbitration model during the natural language input recognition process. The natural language input recognizer 204 also includes an event handler module 232, a query handler module 234, an evidence graph 236, a hypothesis generator module 238, a hypothesis scoring module 240, an evidence cost model 242, a user interface (UI) response model 244, and a response handler module 246. Each of these modules and components will be described in further detail below. These modules and components of the natural language input recognizer 204 may be implemented at the computing devices 202 as respective sets of instructions that, when executed, carry out functionality associated with functionality associated with recognizing natural language input based on evidence asynchronously received. It should be recognized that the natural language input recognizer 204 depicted in FIG. 2 is but one possible implementation that may be selectively employed. Other implementations may implement the natural language input recognizer described herein using additional or alternative modules, components, or sets of instructions that carry out the functionality associated with evidence-based natural language input recognition.

The arbitration module 226, in this example, is configured to arbitrate between competing output recognition hypotheses generated during the natural language input recognition process based on asynchronously received evidence and select one of the output recognition hypotheses as the final recognition result for natural language input received. As noted above, the arbitration module 226, in this example, utilizes a semantic model 228 and an evidence model 230 during the natural language input recognition process. In some example implementations, the semantic model 228 and the evidence model 230 may be combined into a single arbitrator model utilized by the arbitration module 226 as shown by way of example in FIGS. 3A-B and discussed in further detail below.

The arbitration module 226, in this example, is also configured to maintain and update the evidence graph 236, obtain evidence from various evidence sources, and update the evidence graph based on the evidence obtained. The arbitration module 226 is configured to receive evidence in event notifications via the event handler module 232. The arbitration module 226 is also configured to initiate queries to evidence sources and receive evidence via the query handler module 234 in responses to those queries. The arbitration module 226 is configured to apply the evidence obtained to evidence definitions defined in the evidence model 230. When evidence matches an evidence definition defined in the evidence model 230, the score for an output recognition hypothesis associated with that evidence definition may be boosted in order to bias selection of that output recognition hypothesis as the final recognition result over another output recognition hypothesis. The arbitration module 226 is also configured to update the evidence graph 236 when evidence matches an evidence definition of the evidence model 230 and instruct the hypothesis generator module 238 generate new output recognition hypotheses when the evidence graph is updated. Updating the evidence graph 236 and generating output recognition hypotheses will be discussed in further detail below.

The arbitration module 226, in this example, is additionally configured to determine when to select one of the output recognition hypotheses as the final recognition result for the natural language input received. The arbitration module 226 is also configured to determine whether to wait for additional evidence before selecting a final recognition result and whether to provide a preliminary recognition result before selecting the final recognition result. The arbitration module 226 utilizes the hypothesis scoring module to score the output recognition hypotheses generated during the natural language input recognition process. The arbitration module 226 may select one of the output recognition hypotheses as the final recognition result when the score for that output recognition hypothesis exceeds a predefined threshold score. The arbitration module 226 also utilizes the evidence cost model 242 to determine whether or not to wait for receipt of additional evidence based on the costs (e.g., latency) associated with obtaining that additional evidence. The arbitration module 226 is also configured to provide the final recognition result to the response handler module 246 which in turn utilizes the UI response model 244 to initiate a response associated with the final recognition result. Scoring output recognition hypotheses, providing preliminary and final recognition results, and evaluating the cost of obtaining additional evidence will also be discussed in further detail below.

The semantic model 228, in this example, defines a set of semantic definitions that include both intent definitions and slot definitions. The set of semantic definitions may be general semantic definitions applicable in multiple natural language input recognition contexts. The set of semantic definitions may also be context-specific semantic definitions applicable to a specific natural language input recognition context such as, e.g., a specific software application. The semantic definitions of the semantic model 228 may include intent definitions and slot definitions that may be associated with the intent definitions. An intent refers to a high-level meaning of the natural language input. Examples of intents include a request for a weather forecast (i.e., intent: "GetWeather") and a request to submit a search query (i.e., intent: "Query"). Slots refer to parameters associated with the intent. Examples of slots include the location and date for the weather forecast (i.e., location: "Paris" and date: "today") and a topic for the search query (i.e., topic: "Paris"). Semantic definitions for these examples may thus corresponding to the following tuples of information in some example implementations: {intent: "GetWeather", slot: location, slot: date} and {intent: "Query", slot: topic}. Slots may be local relative to a particular intent and thus recognized only for that particular intent. Slots may also be global relative to multiple intents and thus may be recognized for each of those multiple intents.

In some example implementations, the semantic model 228 may include hierarchical intent definitions in which some intents inherit from more general intents. In this way, general intent definitions may be extended to include specialized intents (e.g., intent=Gen_Intent and intent=Gen_Intent.Special_Intent). Evidence definitions may be associated with intent definitions as described in further detail below. With respect to hierarchical intent definitions, any evidence associated with a general intent definition may also be associated with more specific intent definitions that inherit from the general intent definition. Hierarchical intent definitions also allow slot definitions to inherit from other slot definitions. Global slot definitions and local slot definitions may inherit from other global slot definitions. Local slot definitions may also inherit from other local slot definitions within their scope.

The semantic model 228 may also be configured to handle ambiguous or incomplete natural language input in which an intent cannot be determined for the natural language input. An example of ambiguous or incomplete natural language input may be the simple phrase, "Paris," which may be applicable to both a "query" intent and a "weather" intent defined in a semantic model. As a result, the phrase will likely result in competing output recognition hypotheses with similar scores. The natural language input recognizer 204 may be configured to utilize various strategies to handle and respond to the ambiguous input. One strategy may include selecting a response associated with one of the output recognition hypotheses as a default response, and performing at least the default response when that output recognition hypothesis is generated (e.g., always providing the weather for the city specified). Another strategy may include performing each of the responses respectively associated with the competing output recognition hypotheses (e.g., both performing a query of the city specified and providing the weather of the city specified).

The semantic model 228 may also include a generic (or anonymous) intent definition that includes potentially ambiguous slot definitions (e.g., a "city" slot). The generic intent defined in the semantic model 228 may thus compete with other intents (e.g., a "weather" intent and "query" intent). The generic intent may be configured with a relatively low probability such that an output recognition hypothesis for the generic intent is selected as a recognition result only when the output recognition hypotheses do not include any output recognition hypotheses for more specific intents. Continuing the example above, the semantic model may define a global "location" slot as well as respective local location slots for the "weather" intent, the "query" intent, and the generic intent that inherit from the global "location slot." Additional examples will be appreciated with the benefit of this disclosure.

Figure 3B:
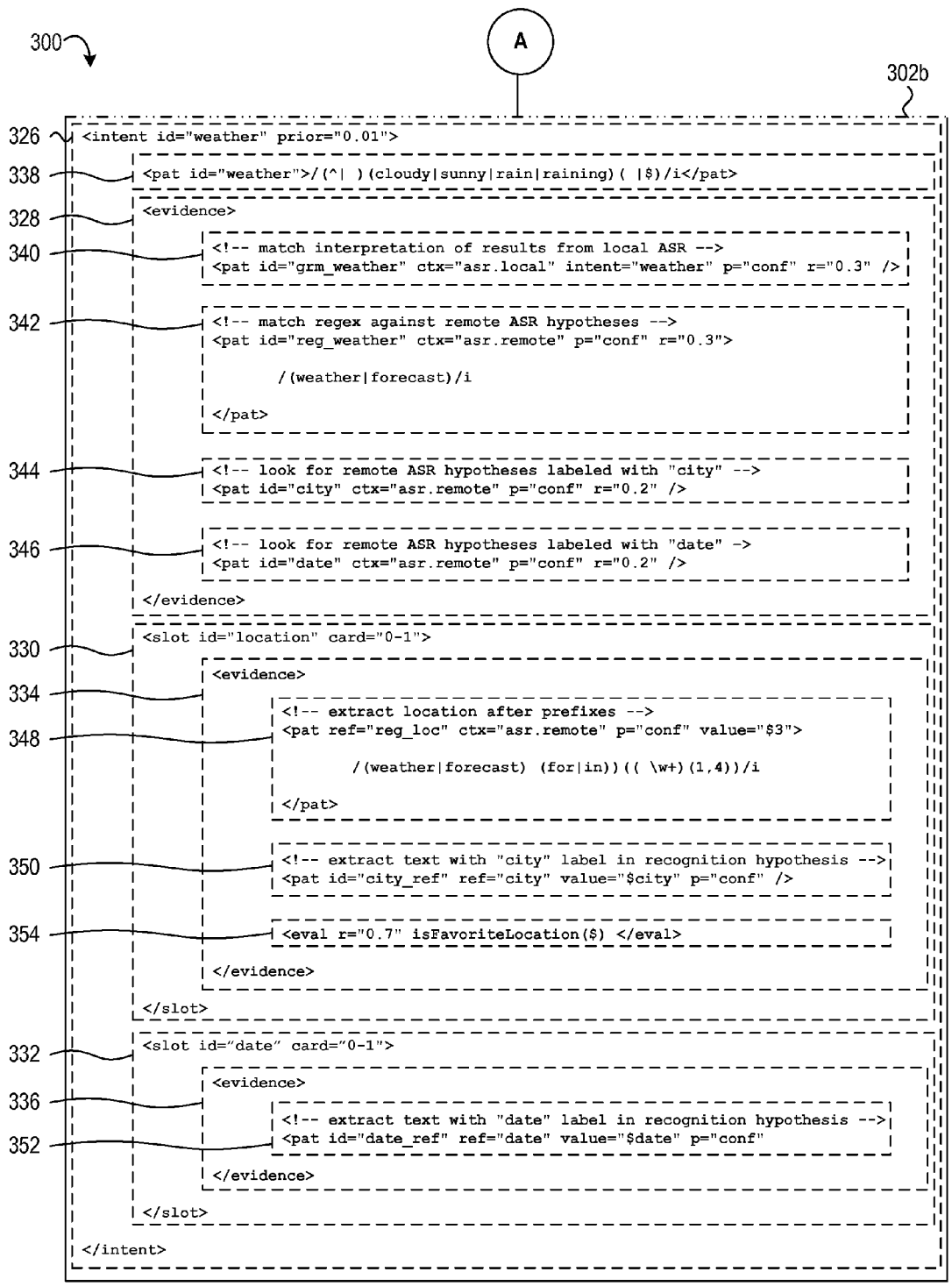
FIG. 3B depicts another portion of the arbitration model of FIG. 3A in accordance with illustrative aspects described herein.

As noted above, the semantic model 228 may be context-specific. Accordingly the semantic definitions of the semantic model 228 may map to the information, actions, commands, or other functionality available in a particular context. An example of an implementation of a semantic model combined with an evidence model is shown in FIGS. 3A-B. The example implementation of the semantic model in FIGS. 3A-B depicts the additional parameters that may be associated with the semantic definitions including, e.g., an identifier, a prior probability value, a confidence value, a precision value, a recall value, a context, regular expressions, and cardinality.

The evidence model 230, in this example, includes a set of evidence definitions. The evidence definitions of the evidence model 230 are matched against the evidence obtained either in an event notification from an evidence source or in a response to a query of an evidence source. As noted above, the arbitration module 226 utilizes the evidence model 230 to generate output recognition hypotheses by matching the evidence to the evidence definitions. As also noted above, evidence includes the transcription recognition hypotheses generated by ASR engines, the semantic recognition hypotheses generated by NLU engines, status information pertaining to the user, status information pertaining to a program executing at a computing devices, and context information pertaining to the environment or circumstances in which the natural language input is received. Accordingly at least some of the evidence definitions of the evidence model 230 may be configured to correspond to the format of the evidence. Parameters associated with evidence definitions are also described in further detail below with reference to FIGS. 3A-B, e.g., an identifier, a context, a probability value, a recall value, references, a slot value, and regular expressions.

The event handler module 232, in this example, is configured to handle any event notification received from the evidence sources in signal communication with the natural language input recognizer 204. Accordingly the event handler module 232 may register with an evidence source such as the application 216 to listen for and receive event notifications in response to events that occur at the evidence source such as functionality that is invoked or input that is received. The evidence sources 206 themselves may also be configured to contact the event handler module 232 in response to an event that has occurred. As an example, the local ASR engine 212 and the remote ASR engine 220 may be configured to deliver their transcription recognition hypotheses to the natural language input recognizer 204, and the event handler module 232 may act as a gateway to the natural language input recognizer for the ASR engines. Similarly, the local NLU engine 214 and the remote NLU engine 222 may be configured to deliver their semantic recognition hypotheses to the natural language input recognizer 204 via the event handler module 232. Accordingly the event handler module 232 is configured to route event notifications to the arbitration module 226 which updates the evidence graph 236 in response.

An event notification may identify the type of event and include the relevant information describing the event. As an example, an event notification from a software application may indicate the event notification provides the current state of the software application and identifies the current screen displayed at the software application, e.g., {event: app_state, screen:home_screen}. As another example, an event notification from an NLU engine may indicate the event notification provides a transcription recognition hypothesis, may indicate that the NLU engine is a local NLU engine, and include a semantic recognition hypothesis with transcribed text, e.g., {event: recognition_result, source: nlu.local, hypothesis: {text: "weather forecast for Paris", intent: "weather", slots: {city: "Paris", date: today}}}. As a further example, in an embedded system, a sensor may provide an event notification identifying the sensor and indicating its status, e.g., {event: warning_light, status: on}. Additional examples of event notifications will be appreciated with the benefit of this disclosure. As noted above, at least some of the evidence definitions in the evidence model 230 may be configured to correspond to the format of the evidence received in the event notification.

The query handler module 234, in this example, is configured to initiate queries to evidence sources and route the query responses to the arbitration module 226. The query handler module 234 may be configured to query both local evidence sources 206 as well as remote evidence sources such as the remote data source 224, e.g., via a network. With respect to the remote data source 224, the query handler module 234 may be in signal communication with a web server (not shown) to send queries and receive query responses via the network 210. At least some of the evidence definitions defined in the evidence module 230 may likewise be configured to correspond to the format of the evidence received in the query responses.

The evidence graph 236, in this example, corresponds to the structured set of output recognition hypotheses that are generated based on the evidence obtained when processing the natural language input received. A brief introduction to the evidence graph 236 is provided here and will be described in further detail below with reference to FIGS. 4-5. During processing of natural language input received at the computing device 202, the evidence graph 236 will be periodically updated to include a root node, initial intent nodes, and phrase evidence nodes. Initial intent nodes refer and correspond to the intents identified in the intent definitions of the semantic model 228. As the arbitration module 226 obtains evidence, phrase evidence nodes are added to the evidence graph 236 that branch from the intent node. Phrase evidence nodes may also branch from other phrase evidence nodes when additional evidence is obtained that matches evidence definitions defined in the evidence model 230.

By allowing phrase evidence nodes to branch from each other, evidence obtained from one source may support evidence obtained from other sources to bias selection of a particular output recognition hypothesis over another output recognition hypothesis. In other words, an output recognition hypothesis that is supported by evidence obtained from relatively more evidence sources (e.g., three evidence sources) is more likely to be accurate than an output recognition hypothesis supported by evidence from relatively fewer evidence sources (e.g., one evidence source). The evidence graph 236 having interconnected intent nodes and phrase evidence nodes thus advantageously enables the natural language input recognizer 204 to leverage multiple pieces of evidence that suggest one particular output recognition hypothesis is correct.

Accordingly the evidence graph 236 may include multiple tiers corresponding to the intents defined in the semantic model and the evidence obtained. The first tier may branch from the root node and include the initial evidence nodes. The second tier may include phrase evidence nodes that branch from the initial evidence nodes. Subsequent tiers may also include phrase evidence nodes that branch from the initial evidence nodes or the phrase evidence nodes of previous tiers. Evidence nodes that do not branch to any subsequent evidence nodes may be referred to as leaf evidence nodes. It will be appreciated that the evidence graph 236 may include leaf evidence nodes at any of its tiers, i.e., leaf evidence nodes of some branches may appear in relatively higher tiers while other leaf nodes may appear in relatively lower tiers. It will also be appreciated that a phrase evidence node may branch from multiple evidence nodes in a higher tier, e.g., two evidence nodes in the second tier of an evidence graph may branch to the same evidence node in the third tier. Likewise an evidence node may branch to multiple evidence nodes in a subsequent tier, e.g., an evidence node in the second tier of an evidence graph may branch to two separate evidence nodes in the third tier. As described in further detail below, each intent node and phrase evidence node may include a specific output recognition hypothesis and corresponding score. The arbitration module 226 may thus select one of the output recognition hypotheses based on its corresponding score. Generating the evidence graph, updating the evidence graph, generating output recognition hypotheses, scoring the output recognition hypotheses, and selecting one of the output recognition hypotheses as the final recognition result is discussed in further detail below.

In some example implementations, the evidence graph 236 is configured such that only evidence nodes corresponding to evidence from different evidence sources are interconnected. In this way, the natural language input recognizer avoids boosting a recognition hypothesis with multiple pieces of evidence from the same evidence source. Instead a separate evidence node may be created for each piece of evidence received from that evidence source. As an example, an ASR engine may provide an n-best list of transcription recognition hypotheses, e.g., {event: recognition_result, source: asr.local, hypotheses: {{text: "weather forecast", intent: weather}, {text: "weather forecast for", intent: weather}}} where n is 2. In this example, the evidence graph 236 may include separate evidence nodes each corresponding to one of the transcription recognition hypotheses provided by the ASR engine. In this way, the score for a "weather" hypothesis would be boosted based on each transcription recognition hypothesis individually rather than collectively.

The ability to interconnect evidence nodes may depend on the compatibility of the evidence corresponding to those evidence nodes. In some example implementations, evidence obtained from the same evidence source might be defined to be incompatible, and the natural language input recognizer 204 might prohibit connecting evidence nodes corresponding to evidence obtained from the same evidence source. Other example implementations, however, might allow connecting evidence nodes corresponding to evidence obtained from the same evidence source. Accordingly evidence compatibility may be a configurable aspect of the natural language input recognizer 204, and additional and alternative rules may be selectively employed to define and customize the compatibility of the evidence obtained.

The hypothesis generator module 238, in this example, is configured to generate output recognition hypotheses based on the evidence graph 236. When the evidence graph 236 is updated with new evidence nodes, it will be recognized that those new evidence nodes are the new leaf evidence nodes of the evidence graph. The hypothesis generator module 238 traverses each path (or branch) of the evidence graph 236 and generates a respective output recognition hypothesis for each of the new leaf nodes that have been added to the evidence graph. In this way, the hypothesis generator module 238 refines the output recognition hypotheses over time as new evidence is obtained. In some example implementations, an evidence node may correspond to multiple matching evidence definitions having the same compatibility with respect to other matching evidence definitions. Accordingly the hypothesis generator module 238 may generate multiple output recognition hypotheses for the same evidence node when that evidence node corresponds to multiple matching evidence definitions in the evidence model 230. The hypothesis generator module 238 may also generate multiple output recognition hypotheses for the same evidence node when it encounters incompatible slot values in recognition hypotheses. Slot values may be incompatible where, for example, they overlap in time in the recognition hypotheses received from the recognition engines or where the semantic model imposes cardinality restraints. Generating output recognition hypotheses based on the evidence graph is discussed in further detail below with reference to FIGS. 4-5.

The hypothesis scoring module 240, in this example, is configured to score the output recognition hypotheses generated by the hypothesis generator module 238. As noted above, the hypothesis generator module 238 generates a new set of output recognition hypotheses as additional evidence is obtained. The hypothesis scoring module 240 may thus score each new set of output recognition hypotheses, and the arbitration module 226 may utilize the respective scores to determine whether one of the output recognition hypotheses should be selected as the final recognition result for the natural language input received. The arbitration module 226 may select the final recognition result when the score for one of the output recognition hypotheses exceeds a predetermined score threshold (e.g., 90%). In some example implementations, the scores generated by the hypothesis scoring module 240 may be probabilities. The probability associated with an output recognition hypothesis may be an overall probability that is based on probabilities respectively associated with the intent and slot values of the output recognition hypothesis. Accordingly the overall probability of an output recognition hypothesis may be an average or other aggregation of an intent probability and one or more slot value probabilities. The values for the intent probabilities and the slot value probabilities may be based on confidence values that accompany the recognition hypotheses received from the recognition engines. As described in further detail below with reference to FIGS. 3A-B, the intent and slot value probabilities may depend on the evidence definitions of the evidence model 230 which may boost or depress the confidence values associated with recognition hypotheses that match those evidence definitions.

The hypothesis scoring module 240 may selectively employ various strategies for scoring the output recognition hypotheses. In general, the hypothesis scoring module 240 may employ a scoring function that takes as input the semantic definitions defined in the semantic model 228 and indications of which of those semantic definitions are represented in the output recognition hypotheses being scored. The hypothesis scoring module 240 may employ the same scoring function to score both the intents and slot values of the semantic definitions. The various scoring functions that may be employed may each be configured, in general, to evaluate the probability that a particular intent or slot value is accurate given the presence or absence of matching evidence definitions from the evidence model 230. One possible scoring function that may be selectively employed is the Precision-Recall scoring function that utilizes a precision value and a recall value associated with the semantic definitions in the semantic model 228 or the evidence definitions defined in the evidence model 230. A trained statistical classifier may also be employed to predict probabilities for the intents and slot values. Evidence definitions that do or do not match the evidence obtained may be treated as additional features utilized by the trained statistical classifier. Suitable classifiers include, for example, support vector machines (SVM), maximum entropy models, and Bayesian networks.

As noted above, a precision-recall scoring function may be selectively employed in some example implementations. Where processing of the natural language input is based on evidence obtained, the precision-recall scoring function may be referred to as an evidence precision-recall scoring function. The evidence precision-recall function may be utilized to score each of the output recognition hypotheses that have been generated from the evidence obtained. To score an output recognition hypothesis, the evidence precision-recall function, in this example, is configured to accept four parameters as input: i) a precision value, p, between 0 and 1; ii) a recall value, r, between 0 and 1; iii) a binary value indicating whether the evidence holds for a particular evidence definition; and iv) a prior probability associated with the intent of the output recognition hypothesis. The prior probability for an intent may be specified in the semantic model as discussed in further detail below with reference to FIGS. 3A-B. The precision and recall values may be assigned manually or estimated based on a data sample. Evidence precision refers to the probability that the output recognition hypothesis is correct given that the evidence holds for an evidence definition. Evidence recall refers to the probability that the evidence holds for an evidence definition given that the output hypothesis is correct. Evidence may be assigned a high precision value when it is likely that the output recognition hypothesis will be accurate when the evidence holds for an evidence definition. Evidence may also be assigned a relatively low precision value to avoid output recognition hypotheses associated with that evidence. Similarly evidence may be assigned a relatively high recall value when a sample of real-world data indicates that a relatively large portion of accurate recognition results exhibit that evidence. Accordingly where evidence having a relatively high recall value has not been obtained, the output recognition hypothesis associated with that missing evidence will be less likely to be accurate.

The evidence cost model 242, in this example, may associate evidence sources and various types of evidence with a corresponding cost of obtaining evidence of those types or from those evidence sources. Examples of costs that may be associated with evidence sources or evidence types include response time and network bandwidth. As an example, in an embedded automotive environment, the costs associated with obtaining evidence from local recognition engines or from vehicle systems and sensors may be zero as the natural language input recognizer is in direct signal communication with those evidence sources. With respect to remote evidence sources, however, there are non-zero costs associated with obtaining evidence from those remote evidence sources as such evidence is obtained via a network in this example, e.g., network availability, network latency, and available bandwidth. The arbitration module 226 may thus evaluate the costs of obtaining evidence from evidence sources associated with non-zero costs. Continuing the example above, the arbitration module 226 may estimate the response time for receiving evidence from a remote evidence source via a network based on an estimate of the network latency and the available bandwidth on the network.

The arbitration module 226 may thus utilize the evidence cost model 242 to determine whether to select a final recognition result sooner (with relatively higher uncertainty) or wait for additional evidence to be obtained before selecting a final recognition later (at higher cost). The arbitration module 226 may also utilize the evidence cost model 242 to determine whether to proactively request additional evidence from an evidence source if that additional evidence would improve the accuracy of the final recognition result selected. The evidence cost model 242 may selectively employ manually-tuned rules for cost-based decisions. The evidence cost model 242 may additionally or alternatively employ trained statistical models that provide an optimal action based on the penalties associated with providing an incorrect final recognition result and the accumulated costs of waiting to obtain additional evidence. The trained statistical model may be configured to minimize a function that compares those penalties and costs. The arbitration module 226 may also utilize the evidence cost model 242 to determine whether to select one of the output recognition hypotheses as a preliminary recognition result, which may be used to trigger a preliminary response while additional evidence is obtained, e.g., an interstitial software application screen, a message indicating the natural language input is being processed, or even the current output recognition hypotheses that have been generated thus far. Additional examples will be appreciated with the benefit of this disclosure.

The UI response model 244, in this example, defines responses that should be triggered in response to a preliminary or final recognition result selected for the natural language input received. The UI response model 244 may also specify conditions that must be satisfied before a defined response is triggered. One example condition is the probability associated with an output recognition hypothesis. A response definition in the UI response model 244 may, for example, specify a minimum probability the probability of an output recognition hypothesis must meet in order for that response to be triggered. A response definition in the UI response model 244 may also specify a threshold relative difference between the probabilities of the top-scoring output recognition hypothesis and the second best scoring output recognition hypothesis (e.g., a difference in probability of at least 50%). Another example is the evidence obtained during processing of the natural language input. A response definition in the UI response model may specify particular evidence definitions that must be observed in order for that response to be triggered (e.g., transcription recognition results from both a local ASR engine and a remote ASR engine). Additional examples will be appreciated with the benefit of this disclosure.

The response handler 246, in this example, is configured to initiate the responses defined in the UI response model 244 and triggered by preliminary and final recognition results selected for the natural language input received. In some example implementations, the arbitration module 226 may notify the response handler 246 when the criteria for a response defined in the UI response model 244 is satisfied. The notification to the response handler 246 may, for example, identify the actions the response handler should initiate or invoke. The notification may also include parameters to use with the response, e.g., the name of the user in a greeting such as "Welcome, $name!" where $name is the name of the user that provided the natural language input.

The types of responses available may depend on the context and the environment in which the natural language input is received. In desktop or mobile computing contexts, for example, example responses include outputting a visual response, e.g., an interstitial screen at a software application or welcome message; an audio response, e.g., a greeting or tone; invocation of specified functionality at a system, device, or software application; activation of various types of electrical, electronic, or electromechanical units; and other types of responses that will be appreciated with the benefit of this disclosure. Accordingly the response handler 246 may be in signal communication with such systems, apparatuses, devices, units, and software applications and configured to instruct or otherwise provide commands to them.

Referring now to FIGS. 3A-B, an example of an implementation of an arbitration model 300 is shown. The arbitration model 300, in this example, combines the semantic model and evidence model as described above. As seen in FIGS. 3A-B, the arbitration model 300 is formatted according to an extensible markup language (XML). It should be recognized that the arbitration model 300 is shown by way of example only and that other implementations of an arbitration model may include additional and alternative semantic definitions and evidence definitions which may be configured for the environment and context in which the natural language input is received.

In FIG. 3A, the portion 302*a* of the arbitration model 300 includes an intent definition 304 for a "query" intent when a user seeks to search for information on a particular topic. The intent definition 304 for the "query" intent includes a set 306 of evidence definitions as well as a slot definition 308 which includes its own set 310 of evidence definitions. The intent definition 304 for the "query" intent includes an identifier (e.g., id="query") and a prior probability value (e.g., prior="0.01"). The slot definition 308 of the intent definition 304 also includes an identifier (e.g., "topic"). The slot definition 308 additionally includes a binary cardinality parameter to indicate whether the "topic" slot is optional (e.g., card="0-1") or mandatory (e.g., card="1") for the "query" intent.

The set 306 of evidence definitions for the intent definition 304 includes various types of evidence definitions in this example. Examples of evidence definitions include evidence definitions configured to match a particular pattern in a transcription recognition result, evidence definitions configured to match a particular semantic label in a semantic recognition result, and evidence definitions configured to match a particular state of an evidence source. Evidence definitions configured to match patterns may be identified in an arbitration model using the <pat> tag, and evidence definitions configured to match state information may be identified using the <state> tag. Additional types of evidence definitions will be appreciated with the benefit of this disclosure. The evidence definitions likewise include identifiers (e.g., id="grm_query" and id="app_state") as well as precision values, p, which may be utilized to score output recognition hypotheses matching those evidence definitions as described above. As seen in FIG. 3A, a precision value, p, may equal the confidence value (e.g., p="conf") of the recognition hypotheses provided by a recognition engine. As described above, however, the precision value, p, may also be some multiple or fraction of the confidence value of the recognition hypothesis provided by a recognition engine. In this way, the arbitration model 300 may boost or depress the confidence value (e.g., p="1.5×conf" or p="0.75×conf") to bias selection of output recognition results matching that evidence definition as described above. An evidence definition may also include a recall value, r, to also bias selection of an output recognition hypothesis (e.g., r="0.2") as also described above. An evidence definition may also include a context parameter, ctx, to restrict the output recognition hypotheses the evidence definition is applicable to (e.g., ctx="asr.local").

The set 306 of evidence definitions, in this example, includes: an evidence definition 312 for evaluating semantic labels applied to transcription recognition hypotheses from a local ASR engine; multiple evidence definitions 314 and 316 for evaluating transcription recognition hypotheses from a remote ASR engine; and an evidence definition 318 for evaluating the state of an application. The evidence definition 312, in this example, evaluated against the intent labels of semantic output recognition hypotheses and the evidence holds when an intent label matches the value of the intent parameter (e.g., intent="query") of the evidence definition. The evidence definition 312 also includes a context parameter (e.g., ctx="asr.local") that limits evaluation of that evidence definition to only those semantic recognition hypotheses having text transcriptions provided by a local ASR engine.

The evidence definitions 314 and 316 utilize regular expressions to match transcription recognition hypotheses having no semantic labels. As seen in FIG. 3A, the regular expressions of the evidence definitions 314 and 316 include word groupings (e.g., "(tell|show|find)" and "(me|us)") that may be referenced to insert slot values extracted from the natural language input received. These evidence definitions 314 and 316 will thus match any transcription recognition hypotheses where the text transcription matches the regular expression specified in the evidence definitions, e.g., "search dictionary for cromulent" and "find me something about turtles." The evidence definitions 314 and 316 also include a context parameter (e.g., ctx="asr.remote") that limits evaluation of those evidence definitions to only transcription recognition hypotheses provided by a remote ASR engine. The evidence definition 318, in this example, is configured to determine whether a software application is in "search" state which may be determined, for example, based on the screen currently displayed at the application (e.g., a search screen) or based on the position of a cursor at the application (e.g., within a search field). The application may provide a value representing its current state, and the evidence definition 318 will thus hold where the value of the application state matches the state value specified in the evidence definition (e.g., value="search").

The slot definition 308 also includes a set 310 of evidence definitions to match a "topic" slot. The set 310 of evidence definitions, in this example, includes three evidence definitions 320, 322 and 324. The evidence definitions 320 and 322 include a reference parameter, ref, to reference the respective evidence definitions 312 and 314 (e.g., ref="regex_query1" and ref="regex_query2"). The evidence definitions 320 and 322 also indicate which word grouping the slot value may be found in the regular expressions of the evidence definitions 312 and 314. In this example, the value for the "topic" slot is found in the third word grouping of the regular expression for the evidence definition 312 (e.g., value="$3") and in the fifth word grouping of the regular expression for the evidence definition 314 (e.g., value="$5"). Names for the word groupings, rather than numbers, may alternatively be employed to indicate candidate slot values. The evidence definitions 320 and 322 also include a precision value, p, like the evidence definitions 312 and 314. The slot definition 308, in this example, also includes a catch-all evidence definition 324 (e.g., id="plain_query") configured to perform a query using the entire phrase of the natural language input. Accordingly, the evidence definition 324 includes a context parameter (e.g., ctx="asr.remote") that limits evaluation of the evidence definition to only transcription recognition hypotheses received from a remote ASR engine. In addition, the evidence definition includes a regular expression that matches the entire transcription in the transcription recognition hypothesis (e.g., "^(.+)$") and indicates the "topic" slot for the query should be the first word grouping (e.g., value="$1") which corresponds to the entire phrase.

Referring now to FIG. 3B, the portion 302b of the arbitration model 300 includes an intent definition 326 for a "weather" intent. The intent definition 326 for the "weather" intent likewise includes a set 328 of evidence definitions and two slot definitions 330 and 332 that each include respective sets 334 and 336 of evidence definitions. The slot definitions 330 and 332 likewise include identifiers (e.g., id="location" and id="date") and cardinality parameters (e.g., card="0-1"). The intent definition 326, in this example, also includes a pattern definition 338 configured to match transcription recognition hypotheses that include a weather-related term (e.g., "cloudy," "sunny," "rain," "raining"). The pattern definition 338 thus includes a regular expression that matches text transcriptions where those weather-related terms appear. The intent definition 326 likewise includes an identifier (e.g., id="weather") and a prior probability value (e.g., prior="0.01").

The set 328 of evidence definitions for the "weather" intent similarly includes various types of evidence definitions. In this example, one of the evidence definitions 340 likewise evaluates the intent labels applied to transcription recognition hypotheses from a local ASR engine (e.g., ctx="asr.local") and holds when the intent label matches the value of the intent parameter (e.g., intent="weather") of the evidence definition. The evidence definition 342 utilizes a regular expression to match the terms "weather" and "forecast" in transcription recognition hypotheses received from a remote ASR engine. The set 328 of evidence definitions also include evidence definitions 344 and 346 respectively configured to look for transcription recognition hypotheses provided by a remote ASR engine (e.g., ctx="asr.remote") that have been labeled with a "city" label or a "date" label. The evidence definitions in the set of evidence definitions likewise include respective precision values, p, and recall values, r.

The slot definition 330, in this example, is configured to identify the location slot in a recognition hypothesis. The set 334 of evidence definitions utilizes various types of evidence definitions to identify the location slot. The evidence definition 348 includes a regular expression to identify the value for the location slot in a transcription recognition hypothesis from a remote ASR engine (e.g., ctx="asr.remote"). The regular expression in the evidence definition 348 matches phrases such as "weather in Georgia" and "forecast for Stone Mountain." The evidence definition 348 indicates that the location slot in this regular expression is located at the third word grouping (e.g., value="$3"). The evidence definition 350, in this example, references the evidence definition 344 (e.g., ref="city") and indicates that the value for the location slot in a transcription recognition hypothesis is the portion of the transcription text that has been labeled with a "city" label (e.g., value="$city"). The set 336 of evidence definitions for the slot definition 332 includes a similar evidence definition 352 that references the evidence definition 346 (e.g., ref="date") and indicates that the value for the date slot in a transcription recognition hypothesis is the portion of the transcription text that has been labeled with a "date" label (e.g., value="$date").

The set 334 of evidence definitions for the location slot definition 330 also includes an evidence definition 354 that is configured to trigger an evaluation at the arbitration module, in particular, an evaluation of a list of favorite locations. If the value appears in the list of favorite locations, then that value may be promoted as the value for the location slot. A relative high recall value (e.g., r=0.7) may be used to promote a value that appears in the list of favorite locations. Evidence definitions configured to trigger evaluations may be identified in an arbitration model using the <eval> tag. The arbitration module may utilize a scripting language to perform evaluations defined in the arbitration model 300. As described above, the arbitration module may be in signal communication with various evidence sources and initiate queries to those evidence sources when performing the evaluations. Other examples of the types of evaluations that may be performed include evaluations of applications, usage histories, user state, environmental context, and other types of evaluations that will be appreciated with the benefit of this disclosure. Examples of other evaluations that may be performed include evaluations of the current date or time, the current location, the distance to a point-of-interest based on the current location, queries of system variables, and other evaluations that will be appreciated with the benefit of this disclosure.

The arbitration module compares the evidence obtained to an arbitration model such as the arbitration model 300. If any of the evidence definitions hold for the evidence obtained, that evidence is mapped to one or more output recognition hypotheses during the hypothesis generation process. The output recognition hypotheses generated are then scored, and the arbitration module determines whether one of the output recognition results should be selected as the final recognition result for the natural language input received based on the scores.

Figure 4:
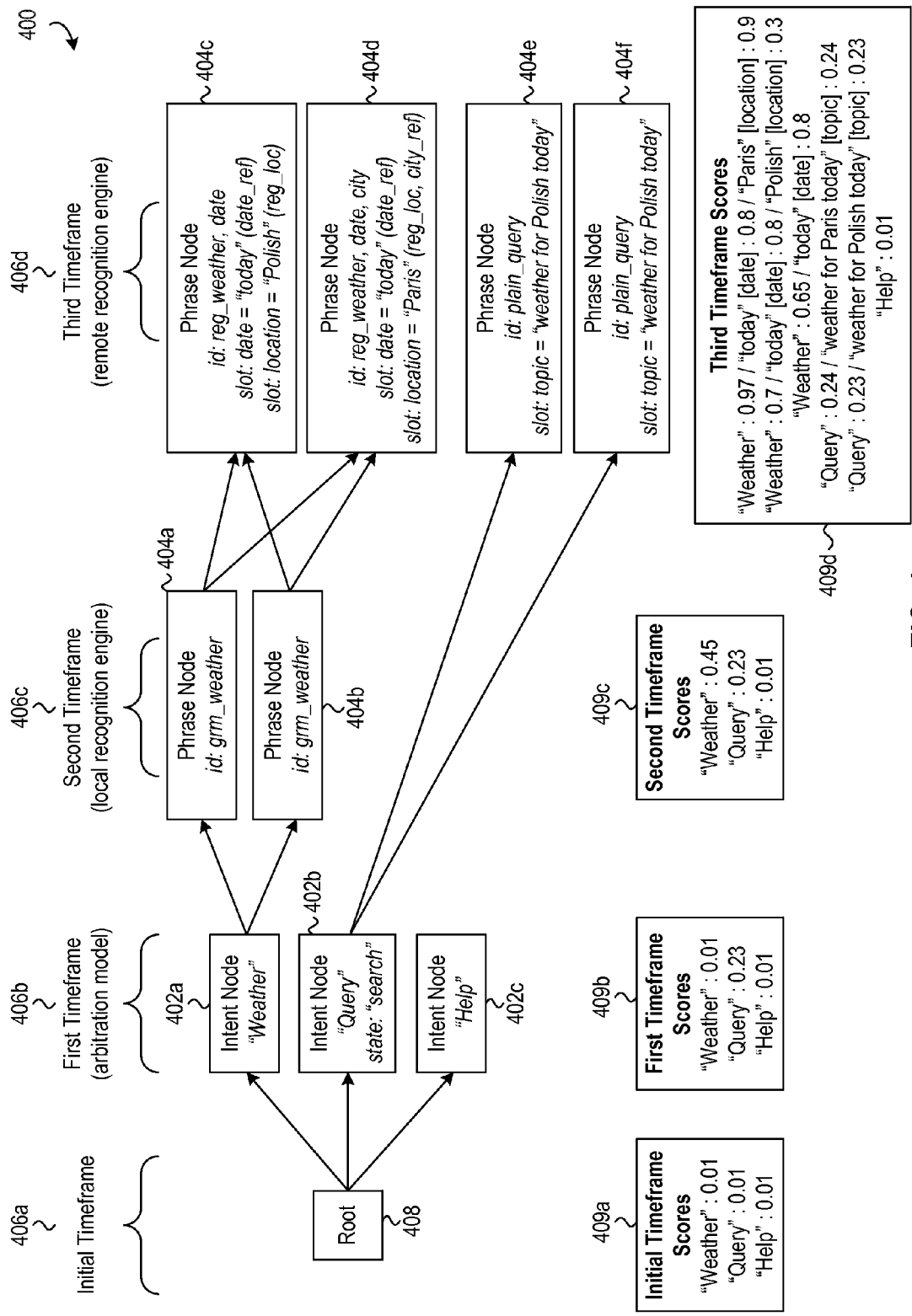
FIG. 4 depicts an example of an implementation of an evidence graph in accordance with illustrative aspects described herein.

Referring now to FIG. 4, an example evidence graph 400 is shown. This example evidence graph 400 may be generated as evidence is obtained during the natural language input recognition process. It will be appreciated that the evidence graph 400 is depicted only by way of example to illustrate the process of comparing evidence obtained to an evidence model and generating output recognition hypotheses based on evidence definitions in the evidence model that match the evidence obtained.

As seen in FIG. 4, the evidence graph includes multiple interconnected evidence nodes (collectively 402 and 404). The evidence nodes 402 and 404 include both intent evidence nodes (collectively 402) and phrase evidence nodes (collectively 404). As also seen in FIG. 4, the evidence nodes 402 and 404 are each associated with respective timeframes (collectively 406). As noted above, a natural language input recognizer may receive evidence asynchronously. Accordingly the timeframes 406, in this example, are not delimited by any fixed interval but rather by the receipt of additional evidence. In other words, a first timeframe may be defined by the receipt of evidence at the natural language input recognizer while a second (subsequent) timeframe may be defined by additional evidence subsequently received at the natural language input recognizer.

In the evidence graph 400, four timeframes 406a-d are depicted. For the initial timeframe 406a, a root node 408 is created that all other evidence nodes 402 and 404 branch from. In this example, an arbitration model may define intent definitions for a "weather" intent, a "query" intent, and a "help" intent. Accordingly, for the first timeframe 406b, the arbitration module has created an intent evidence node 402 for each intent defined in the arbitration model: a "weather" intent evidence node 402a, a "query" intent evidence node 402b, and a "help" intent evidence node 402c. The arbitration module may also evaluate an application state (e.g., "app_state") as described above and match the current application state (e.g., "state="search"") to an evidence definition in the evidence model (e.g., app_state="search"). In response to this evaluation, the arbitration module has configured the "query" intent evidence node 402b to indicate that the evidence obtained relating to the current application state has matched that evidence definition related to application state. The arbitration module may match other types of evidence related to the state or context of the user, application, and environment as described above.

During the initial timeframe 406a, before any evidence is received, each intent defined in the arbitration model may have the same score which may be based on the prior probability values set in the arbitration model. In the arbitration model, in this example, each intent has the same prior probability (e.g., prior="0.01") which is depicted in FIG. 4 at the set of scores 409a for the initial timeframe 406a. It will be recognized that intents defined in the arbitration model need not be the same. Depending on the environment or context the natural language input recognizer is configured for, the prior probabilities may be set to bias certain intents over others, e.g., when training data or other statistics identify the commands or information most requested by users.

During the first timeframe 406b, before any phrase evidence nodes are added, it will be recognized that the intent evidence nodes correspond to the leaf evidence nodes of the evidence graph 400. The hypothesis generator module may thus traverse the evidence graph 400 and generate output recognition hypotheses based on the intent evidence nodes. The hypothesis scoring module may then score the recognition hypotheses generated as described above. In this example, because the arbitration module received evidence indicating the state of the application (e.g., app_state="search"), the hypothesis scoring module may score the output recognition hypothesis for the "query" intent relatively higher as shown in the set of scores 409b for the first timeframe 406b. Having only generated output recognition hypotheses that identify an intent for the natural language input, the arbitration module may determine to wait until additional evidence is received before selecting a final recognition result.

As noted above, the arbitration module updates the evidence graph each time additional evidence is obtained. The additional evidence may include recognition hypotheses from local or remote recognition engines which may be an n-best list of recognition hypotheses having respective confidence scores. The arbitration module may compare each of the recognition hypotheses to the evidence definitions in the evidence model and create a new phrase evidence node 404 when one of the recognition hypotheses holds for one of the evidence definitions, i.e., when the evidence obtained match or otherwise satisfy the parameters set in the evidence definition.

As also noted above, recognition hypotheses from local and remote recognition engines may be received asynchronously. Accordingly the arbitration module may add a first set of phrase evidence nodes for local recognition results received and a second set of phrase evidence nodes for remote recognition results subsequently received. This example scenario is depicted in FIG. 4. For the second timeframe 406c, the phrase evidence nodes 404a and 404b were added to the evidence graph 400 upon matching an evidence definition to two local recognition hypotheses having a "weather" intent label (e.g., "[intent]weather for[/intent]" and "[intent]weather forecast for[/intent]") which both match an evidence definition configured for recognition hypotheses that include a "weather" intent label (e.g., intent="weather"). The phrases nodes 404a and 404b are then linked to existing compatible nodes that share the same intent which, in this example, includes the "weather" intent evidence node 402a. It should be recognized that some of the recognition hypotheses in an n-best list of recognition hypotheses might not match any of the evidence definitions in the evidence model and may not result in the generation of a corresponding phrase evidence node.

Having added the new phrase evidence nodes 404a and 404b associated with the "weather" intent evidence node 402a, it will again be recognized that these phrase evidence nodes represent the leaf evidence nodes in the paths branching from the "weather" intent evidence node. The hypothesis generation module may once again traverse the evidence graph 400 and generate a new set of output recognition hypotheses based on each of the paths traversed. The hypothesis scoring module may then score the new set of output recognition hypotheses. Since the local recognition engine returned recognition hypotheses that included a "weather" intent label which matched an evidence definition in the evidence model, the hypothesis scoring module has scored the "weather" intent relatively higher in the set of scores 409c for the output hypotheses generated during the second timeframe 406c in this example. At this stage, the arbitration module may decide to wait for additional recognition hypotheses from a remote recognition engine in order to identify additional information associated with the "weather" intent such as any specified location or date.

Subsequent to receipt of the local recognition hypotheses, a remote recognition engine may provide remote recognition hypotheses thus defining a third timeframe 406d. As noted above, remote recognition hypotheses may be received subsequent to local recognition hypotheses due to latency associated with the network or the recognition process employed. The remote recognition hypotheses may likewise be an n-best list of recognition hypotheses and include respective confidence scores. In this example, the n-best list of remote recognition hypotheses includes two recognition hypotheses, e.g., "weather for Polish today" and "weather for Paris today." The arbitration module may again compare the remote recognition hypotheses to each of the evidence patterns in the evidence model.

The arbitration module may thus create phrase evidence nodes 404c, 404d, 404e, and 404f based on the remote recognition hypotheses and their matching evidence definitions. The arbitration module has created, in this example, phrase evidence nodes for matching evidence definitions associated with the "weather" intent as well as phrase evidence nodes for matching evidence definitions associated with the "query" intent. Accordingly the arbitration module has connected phrase evidence nodes 404c and 404d to each of phrase evidence nodes 404a and 404b which branch from the "weather" intent evidence node 402a. The arbitration module has similarly connected phrase evidence nodes 404e and 404f to the "query" intent evidence node 402b.

As seen in the evidence graph 400, a phrase evidence node may identify multiple matching evidence definitions where the evidence is compatible. In phrase evidence nodes 404c and 404d, for example, indicate that the recognition hypotheses matched compatible evidence definitions respectively specifying a weather-based regular expression (e.g., id="reg_weather") a "date" label (e.g., id="date"). Phrase evidence node 404d also indicates that its corresponding recognition hypothesis also matched a compatible evidence definition specifying a "city" label (e.g., id="city"). Phrase evidence nodes 404e and 404f indicate that the recognition hypotheses also match an evidence definition configured for general queries (e.g., id="plain_query").

As also seen in the evidence graph 400, a phrase evidence node may identify one or more slots matched from the remote recognition hypotheses and matching evidence definitions associated with those slots. In phrase evidence nodes 404c and 404d, for example, a portion of the remote recognition hypotheses (e.g., "today") has matched an evidence definition specifying a "date" label (e.g., id="date_ref") defined for a "date" slot (e.g., id="date") of the "weather" intent (e.g., id="weather") in the evidence model. In addition, phrase evidence nodes 404c and 404d also indicate that a portion of the remote recognition hypotheses (e.g., "Polish" and "Paris") have matched an evidence definition specifying a location-based regular expression (e.g., id="reg_loc") defined for a "location" slot (e.g., id="location") in the evidence model. Phrase evidence node 404d also indicates that the portion, "Paris," of one of the remote recognition hypotheses also matches an evidence definition specifying a "city" label (e.g., id="city_ref") defined for the "location" slot in the evidence model. The phrase evidence nodes 404e and 404f indicate that the entirety of each remote recognition hypotheses matches an evidence definition specifying a catch-all regular expression (e.g., id=plain_query") defined for a "topic" slot of the "query" intent (e.g., id="weather") in the evidence model.

Having added phrase evidence nodes corresponding to the remote recognition hypotheses, the hypothesis generator module may once again traverse the evidence graph 400 and generate new output recognition hypotheses for each path traversed based on the new phrase evidence nodes 404c, 404d, 404e, and 404f added to the evidence graph in response to receipt of the remote recognition hypotheses. The hypothesis scoring module may then score the new output recognition hypotheses and generate a new set of scores 409d for the new output recognition hypotheses. As seen in FIG. 4, the set of scores 409d include scores for the intent of the recognition hypothesis (e.g., "Weather": 0.97) as well as individual scores for each of the matching slots (e.g., "today" [date]: 0.8 and "Paris" [location]: 0.9). As noted above, the individual intent and slot scores may be based on the confidence values for recognition hypotheses received from recognition engines as well as the prior probability values, precision values, and recall values set in the arbitration model. The overall score for an output recognition hypothesis may thus be an aggregation of the individual intent and slot scores. As seen in FIG. 4, the output recognition hypothesis for the phrase, "weather for Paris today," includes the highest individual scores for its intent and corresponding slots. The arbitration module may thus determine that the overall score for this output recognition hypotheses exceeds a predetermined score threshold and select that output recognition hypothesis as the final recognition result for the natural language input received.

As described above, the arbitration module may decide to provide a preliminary output recognition result before selecting the final output recognition result. In this example, the arbitration module may select a preliminary output recognition result based on the set of scores 409c generated during the second timeframe 406c. In this set of scores 409c, the "weather" intent has been scored the highest. As a result, the arbitration module may select a preliminary recognition result. e.g., a message that states, "Retrieving weather information . . . " The response module may invoke functionality at the computing device to display or otherwise present the message while the natural language input recognizer waits to receive additional evidence.

The natural language input recognizer may also be configured to handle natural language input labeled with multiple intents. An example of natural language input that may be labeled with multiple intents includes natural language input requesting an embedded vehicle control system to turn off the radio and turn on the air conditioning (e.g., "Turn off the radio and turn on the AC."). To model natural language input having multiple intents, an arbitration model may include intent sequence definitions. Using the example above, an intent sequence definition may identify an allowable sequence of specific intents (e.g., intent="AC, Radio") or may indicate that a particular intent may be followed by an arbitrary intent (e.g., intent="AC, *).

To recognize natural language input having multiple intents, the arbitration module may create respective phrase evidence nodes for each intent definition sequence that matches a recognition result received from a recognition engine. The arbitration module may associate each of these phrase evidence nodes with the time range corresponding to the portion of the recognition result that matches the longest spanning evidence definition for the phrase evidence node. The compatibility of evidence nodes may be configured such that phrase evidence nodes corresponding to allowable intent sequences and having non-overlapping time ranges may be connected in the evidence graph. The hypothesis generator module may thus traverse the evidence graph and generate output recognition hypotheses having multiple intent hypotheses. In addition, the hypothesis scoring module may score each of the multiple intents in an output recognition hypothesis.

Figure 5:
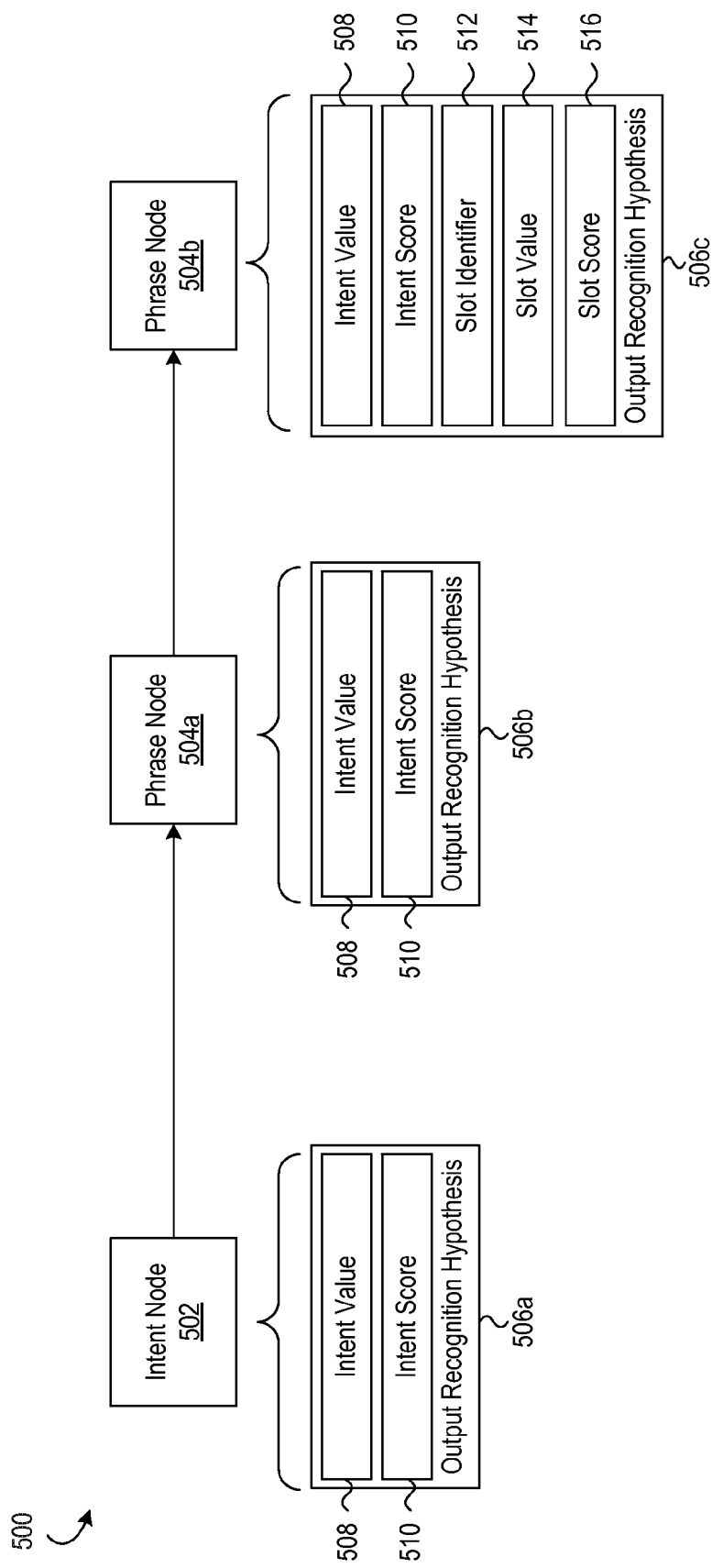
FIG. 5 depicts a portion of another example of an implementation of an evidence graph in accordance with illustrative aspects described herein.

Referring now to FIG. 5, a portion of a general evidence graph 500 is shown to generally depict some of the concepts described above. As seen in FIG. 5 and as described above, an evidence graph 500 may include an intent evidence node 502 that branches to one or more phrase evidence nodes (collectively 504). A phrase evidence node, such as phrase evidence node 504a, may also branch to subsequent phrase evidence nodes, such as phrase evidence node 504b. A hypothesis generator module may generate respective output recognition hypotheses (collectively 506) for the intent and phrase evidence nodes. The output recognition hypotheses 506a, 506b, and 506c may include or otherwise identify an intent value 508 for an intent hypothesis and a corresponding score 510 for the intent hypothesis. The overall scores for the output recognition hypotheses 506 may be based, at least in part, on their respective intent scores. Some output recognition hypotheses, such as output recognition hypothesis 506c, may also include, for any slots identified, a slot identifier 512, a slot value 514, and a slot score 516. The overall score for an output recognition hypothesis 506 may further be based on the slot scores of any slots it includes or otherwise identifies.

Figure 6:
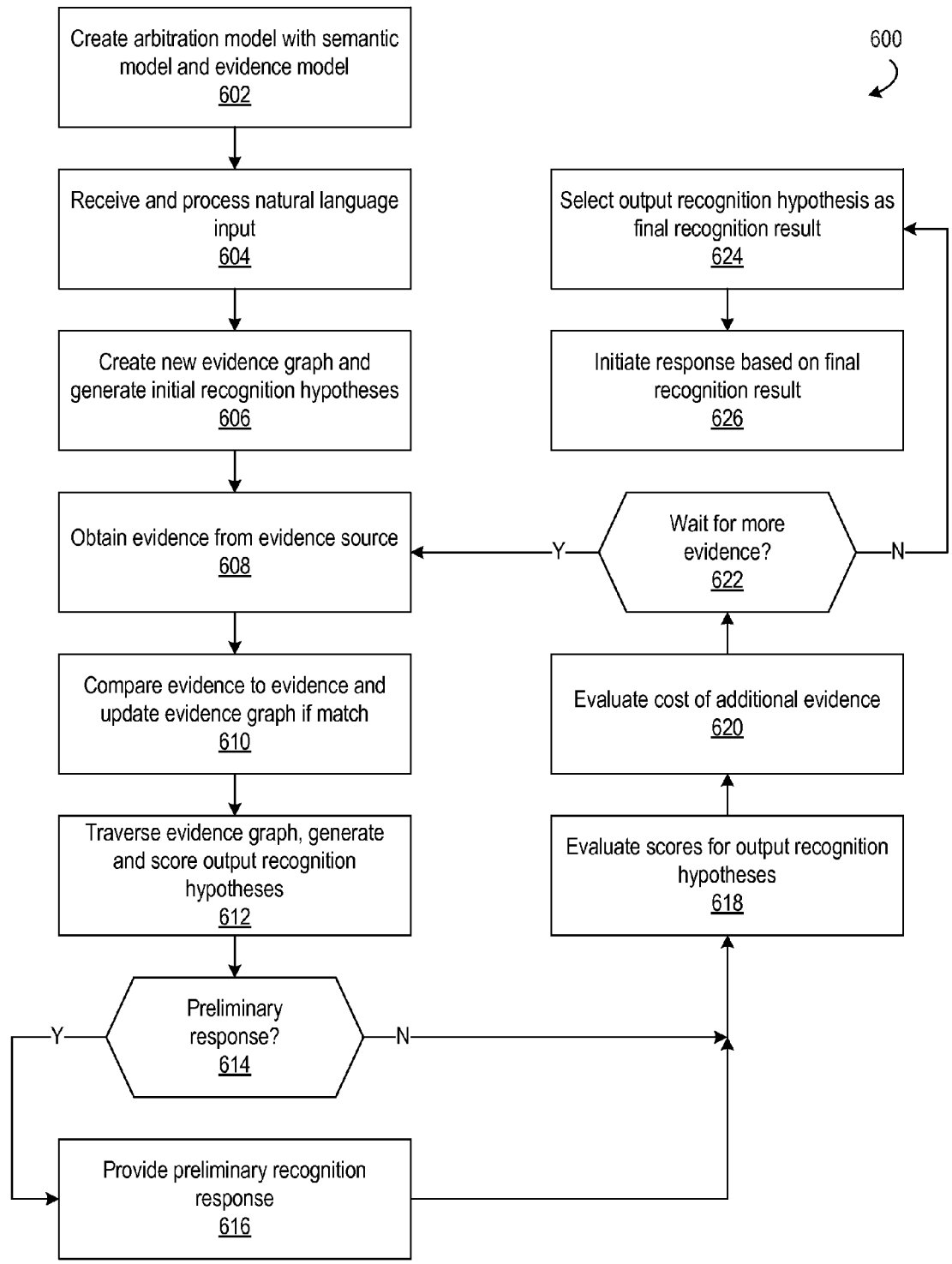
FIG. 6 depicts a flowchart of example method steps for evidence-based natural language input processing in accordance with illustrative aspects described herein.

Referring now to FIG. 6, some of the example method steps for processing natural language input discussed above are depicted in a flowchart 600. A natural language modeler first creates and configures an arbitration model that may include both a semantic model and an evidence model (block 602). The semantic model may include semantic definitions and the evidence model may include evidence definitions related to or otherwise associated with the semantic definitions as described above. A computing device having a natural language input recognizer receives natural language input at a natural language input interface and initiates processing of the natural language input (block 604). Upon receipt of the natural language input, the natural language input recognizer creates a new evidence graph and generates initial recognition hypotheses (block 606) based, e.g., on the intents defined in the arbitration model and any initial evidence obtained such as application state or user state.

The natural language input recognizer may then obtain evidence from an evidence source (block 608). As noted above, the evidence may be obtained actively (e.g., via a query to the evidence source) or passively (e.g., via a communication from the evidence source). Upon receipt of the evidence, the natural language input recognizer compares the evidence to the evidence model and updates the evidence graph if the evidence matches an evidence definition in the evidence model (block 610). As noted above, the natural language input recognizer may update the evidence graph by adding intent evidence nodes or phrase evidence nodes and interconnecting related nodes. When new evidence nodes are added, the natural language input recognizer traverses the evidence graph to generate and score new output recognition hypotheses based on the new evidence nodes (block 612). Generally speaking, traversing a single path of connected compatible evidence nodes yields a single output recognition hypothesis. However, if some evidence nodes along the path contain evidence for slot values to be extracted, there may be multiple output recognition hypotheses generated that contain different combinations of slot values subject to constraints imposed by the semantic model (e.g., cardinality constraints).

As noted above, the natural language input recognizer may provide a preliminary recognition response before selecting one of the output recognition hypotheses as the final recognition result for the natural language input received. The natural language input recognizer may utilize an evidence cost model to assess the costs of waiting for additional evidence. As noted above the evidence cost model may be utilized to compare the costs associated with an incorrect final recognition result to the costs associated with waiting for additional evidence. If the natural language input recognizer decides to provide a preliminary recognition response (block 614:Y), then the natural language input recognizer may select and provide a desired preliminary recognition response (block 616), e.g., utilizing a UI response model. As noted above, the preliminary recognition response may include presenting a message, transmitting a message, invoking of functionality at a device or software application, and other types of responses that will be appreciated with the benefit of this disclosure.

Having scored the output recognition hypotheses, the natural language input recognizer may evaluate the scores for the output recognition hypotheses (block 618). As an example, the natural language input recognizer may compare the scores to a predetermined score threshold (e.g., a probability score of above 90%). If only one output recognition hypothesis has a score that exceeds the score threshold, the natural language input recognizer may select that output recognition hypothesis as the final recognition result for the natural language input received. If the scores for multiple output recognition hypotheses exceed the score threshold—or if none of the scores exceed the score threshold—the natural language input recognizer may decide to wait for additional evidence before selecting the final recognition result. The natural language input recognizer may also select one of the output recognition hypotheses as the final recognition result based on a configured condition, such as when its score exceeds the score of a second best output recognition hypothesis by a predetermined difference threshold (e.g., a difference of more than 10%).

The natural language input recognizer may likewise utilize an evidence cost model to determine whether to obtain additional evidence. If the natural language input recognizer decides to obtain additional evidence (block 622:Y), the steps depicted at blocks 608-620 may be repeated to obtain additional evidence and refine the output recognition hypotheses. If the natural language input recognizer determines that it has obtained enough evidence (block 622:N), then the natural language input recognizer may select one of the output recognition hypotheses as the final recognition result (block 624) and initiate a response based on the final recognition result selected (block 626). The natural language input recognizer may similarly utilize a UI response model to determine which response or set of responses should be initiated based on the final recognition result.

Referring to FIG. 7, an example of an implementation of a UI response model 700 is shown. The UI response model 700, in this example, is XML formatted. In some example implementations, the arbitration model may be extended to include a UI response model along with a semantic model and an evidence model. The UI response model 700, in this example, similarly includes an intent definition 702 for a "name" intent which may be utilized when the natural language input includes the name of a user. The intent definition 702, in this example, also includes a reaction definition 704, a set 706 of evidence definitions, and a slot definition 708. As described in further detail below, the UI response model may include constraints or requirements that must be satisfied before an action is performed. It should be recognized that the UI response model 700 is only shown by way of example, and other implementations of a UI response model may include additional and alternative intent definitions, reaction definitions, constraints, or requirements depending on the environment or context in which the natural language input is received.

The reaction definition 704, in this example, includes an action group 710 and a trigger constraint 712. The action group 710 is configured with two actions 714 and 716 which, in this case, are announcement actions that provide an audio greeting using the user name extracted from the natural language input received. The arbitration module may provide the response handler module with the text of the actions 714 and 716, and the response handler module may invoke, e.g., a text-to-speech (TTS) engine that provides the audio greeting. As described above, the responses may also include text greetings presented visually at a display, commands sent to devices or software applications, or other types of functionality invoked at other devices or software applications. An action group may thus include one or more actions of various types of responses, e.g., audio, visual, audiovisual, tactile (vibrations), and other types of responses that will be appreciated with the benefit of this disclosure. Not all of the actions defined in an action group need to be performed. In some example implementations, only one of multiple actions in an action group may be selected to be performed. The actions may be associated with a probability that makes all actions equally likely to be randomly selected or makes a particular action more or less likely to be randomly selected. The actions may also be associated with a sequence number such that a set of multiple action in an action group are performed in sequence.

The trigger constraint 712 specifies a condition that must be satisfied before performing the actions 714 and 716 in the action group 710 of the reaction definition 704. The trigger constraint 712, in this example, specifies that the recognitions results must have been received from both a local recognition engine and a remote recognition engine (e.g., src="asr.local, asr.remote"). The trigger constraint 712 also specifies a minimum confidence value (threshold) for any recognition hypotheses having a "name" intent that are received from the recognition engines (e.g., min_conf="0.7").

The set 706 of evidence definitions may similarly specify evidence that should be obtained before performing the actions 714 and 716 in the action group 710 of the reaction definition 704. The set 706 of evidence definitions, in this example, includes two evidence definitions 718 and 720 identifying evidence that should be received before performing the actions 714 and 716. The first evidence definition 718 is configured such that a recognition hypothesis labeled with a "name" intent (e.g., intent="name") should be received from a local recognition engine (e.g., ctx="asr.local") before performing the actions 714 and 716. The second evidence definition 720 is configured such that a recognition hypothesis that matches a name-based regular expression should be received from a remote recognition engine (e.g., ctx="asr.remote") before performing the actions 714 and 716. The slot definition 708 similarly includes a set 722 of evidence definitions that may be used in conjunction with the set 706 of evidence definitions. The set 722 of evidence definitions, in this example, includes only one evidence definition 724 that references (e.g., ref="remote_name") the evidence definition 720 in order to identify which word grouping of the regular expression the value for the user name may be extracted from. In this example, the evidence definition 724 indicates the value for a "name" slot appears in the first word grouping of the named-based regular expression in the evidence definition 720 (e.g., slot-value="$1").

Figure 8:
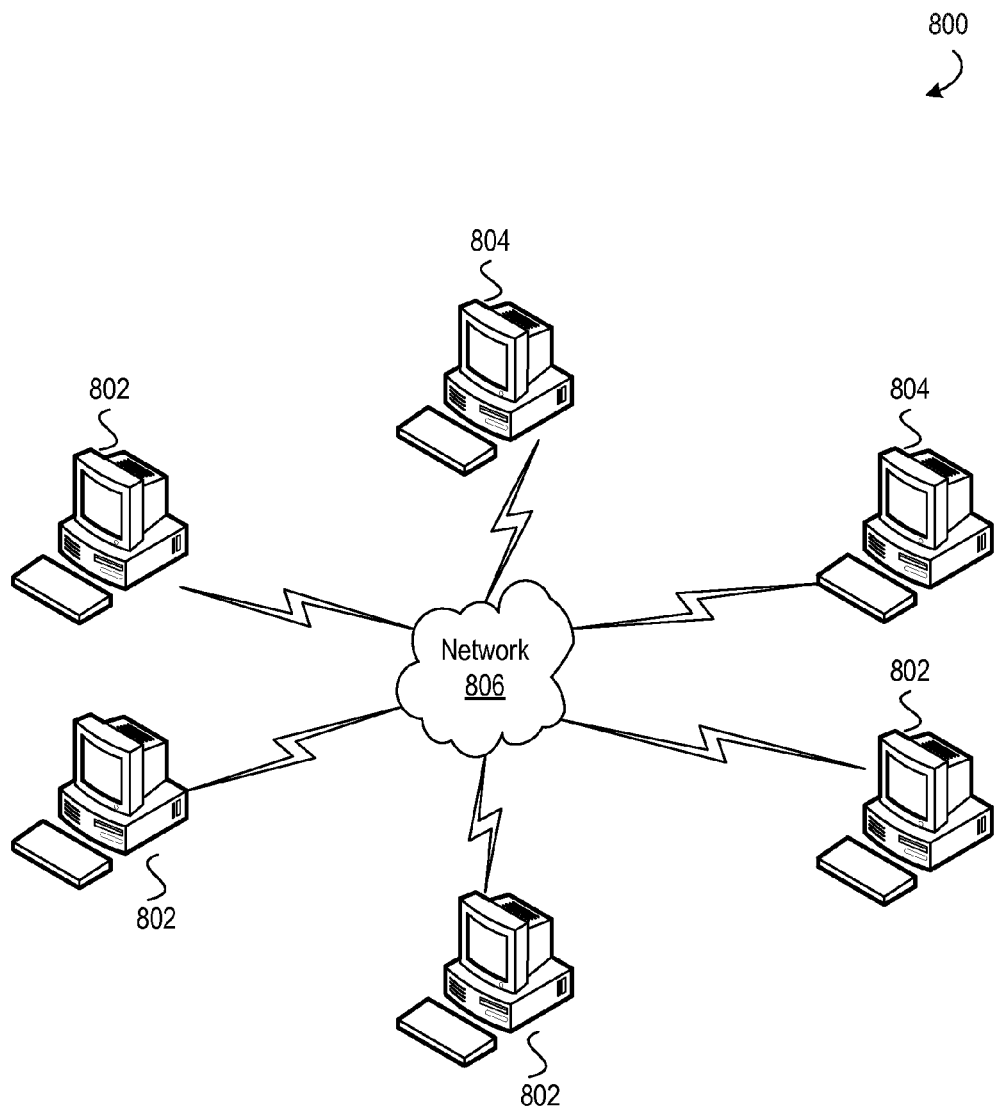
FIG. 8 depicts an example of an implementation of a computing environment in which aspects of the present disclosure may be implemented.

In FIG. 8, an example of an implementation of a computing environment 800 in which aspects of the present disclosure may be implemented is shown. Client computing devices 802 and server computing devices 804 provide processing, storage, and input/output devices executing application programs and the like. Client computing devices 802 may include, e.g., desktop computers, laptop computers, tablet computers, palmtop computers, smartphones, smart televisions, and the like. Client computing devices 802 can also be linked through communications network 806 to other computing devices, including other client devices computing devices 802 and server computing devices 804. Communications network 806 can be part of a remote access network, a global network (e.g., the Internet), a cellular network, a worldwide collection of computers, local area or wide area networks, and gateways that currently use respective protocols (TCP/IP, Bluetooth, etc.) to communicate with one another. Other electronic device/computer network architectures are suitable.

Figure 9:
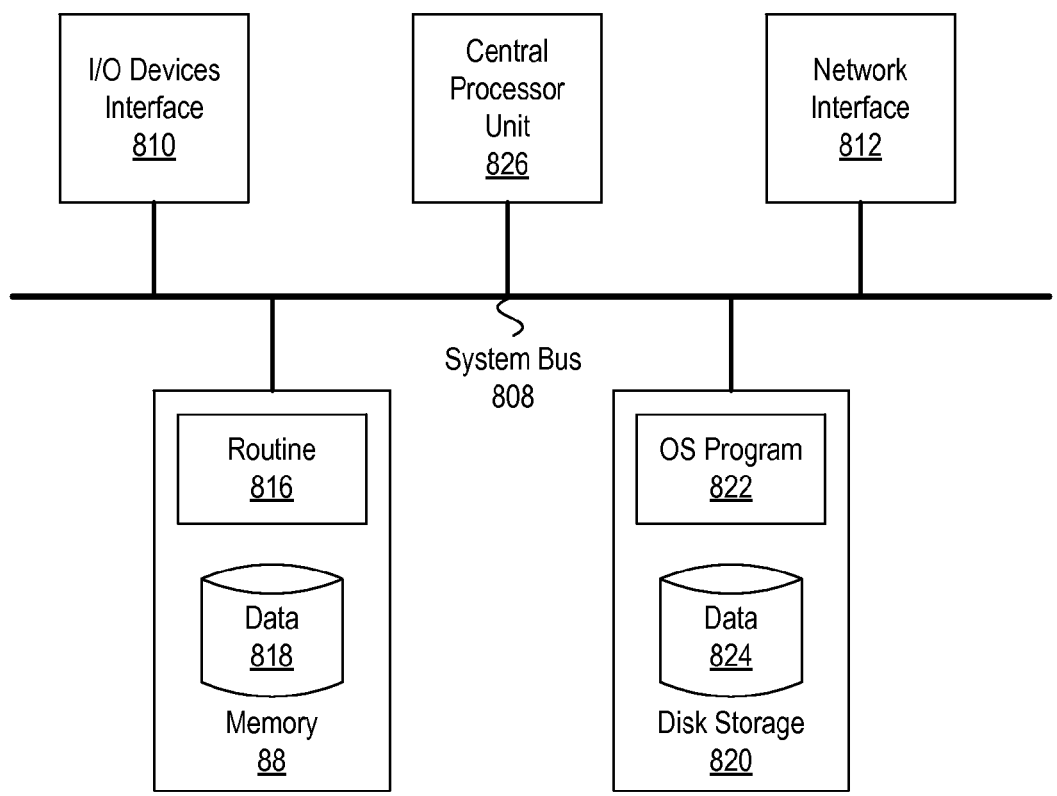
FIG. 9 depicts a block diagram of one of the computing devices of the computing environment of FIG. 8.

In FIG. 9, a block diagram of one of the computing devices 802 or 804 of the computing environment 800 of FIG. 8 is shown. The computing device 802 or 804 contains system bus 808, where a bus is a set of hardware lines used for data transfer among the components of a computing device or processing system. Bus 808 is essentially a shared conduit that connects different elements of a computing device (e.g., processor, disk storage, memory, input/output ports, network ports, etc.) that enables the transfer of information between the elements. Attached to system bus 808 is I/O device interface 810 for connecting various input and output devices (e.g., keyboard, mouse, microphone, camera, displays, printers, speakers, etc.) to the computing device 802 or 804. Network interface 812 allows the computing device to connect to various other devices attached to a network (e.g., network 806 of FIG. 8). Memory 814 provides volatile storage for computer software instructions 816 and data 818 used to implement aspects described herein (e.g., a recommendation engine implementing the steps detailed above). Disk storage 820 provides non-volatile storage for computer software instructions 822 and data 824 used to implement various aspects of the present disclosure. Central processor unit 826 is also attached to system bus 808 and provides for the execution of computer instructions.

In one embodiment, the processor routines 816 and 822 as well as data 818 and 824 are a computer program product, including a computer-readable medium (e.g., a removable storage medium such as one or more DVD-ROM's, CD-ROM's, diskettes, tapes, etc.) that provides at least a portion of the software instructions for implementing aspects of the present disclosure. The computer program product can be installed by any suitable software installation procedure, as is well known in the art. At least a portion of the software instructions may also be downloaded over a cable, communication and/or wireless connection. Computer-readable media include all computer-readable media but do not include transitory propagating signals.

One or more aspects of the disclosure may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects of the disclosure, and such data structures are contemplated within the scope of computer executable instructions and computer-usable data described herein.

Although the subject matter has been described in language specific to structural features and/or methodological acts, it is to be understood that the subject matter defined in the appended claims is not necessarily limited to the specific features or acts described above. Rather, the specific features and acts described above are described as example implementations of the following claims.

What is claimed is:

1. A method of recognizing natural language input comprising:
    receiving natural language input at a natural language input interface of a computing device comprising a natural language input recognizer;
    obtaining, by the natural language input recognizer, evidence from an evidence source;
    generating, by the natural language input recognizer, an evidence graph based, at least in part, on the evidence obtained, wherein the evidence graph comprises a set of evidence nodes, wherein the set of evidence nodes comprises a set of one or more intent evidence nodes and a set of one or more phrase evidence nodes, and wherein at least one phrase evidence node is connected to at least one intent evidence node;
    generating a set of recognition hypotheses based, at least in part, on the evidence graph; and
    selecting a recognition hypothesis of the set of recognition hypotheses as a recognition result for the natural language input for triggering a response.

2. The method of claim 1, further comprising:
    wherein obtaining evidence from the evidence source comprises asynchronously obtaining evidence from a plurality of evidence sources; and
    wherein generating the set of recognition hypotheses comprises generating a first set of recognition hypotheses based on evidence obtained during a first timeframe, and generating a second set of recognition hypotheses based on evidence obtained during a second timeframe subsequent to the first timeframe.

3. The method of claim 2, wherein generating the set of recognition hypotheses further comprises traversing a path of the evidence graph, and generating a recognition hypothesis based on the path traversed.

4. The method of claim 3, further comprising:
    generating a score for each one of the recognition hypotheses;
    wherein the recognition hypothesis selected as the recognition result for the natural language input is selected based on the score.

5. The method of claim 4, further comprising:
    comparing the score for each one of the recognition hypotheses to a score threshold;
    wherein the score of the recognition hypothesis is selected as the recognition result for the natural language input exceeding the score threshold.

6. The method of claim 1, wherein each evidence node in the set of evidence nodes is based on the evidence obtained by the natural language input recognizer.

7. The method of claim 6, further comprising:
    wherein each intent evidence node comprises an intent hypothesis and an intent score for the intent hypothesis; and
    wherein each phrase evidence node comprises a slot hypothesis and a slot score for the slot hypothesis.

8. The method of claim 7 further comprising:
    wherein the set of one or more phrase evidence nodes is a first set of phrase evidence nodes; and
    wherein the set of evidence nodes further comprises a second set of one or more phrase evidence nodes, wherein at least one phrase evidence node in the second set of one or more phrase evidence nodes is connected to at least one of a phrase evidence node in the first set of one or more phrase evidence nodes and at least one intent evidence node of the set of one or more intent evidence nodes.

9. The method of claim 6, further comprising:
    wherein generating the evidence graph comprises comparing the evidence obtained by the natural language input recognizer to one or more evidence definitions defined in an evidence model; and
    determining whether the evidence holds for the one or more evidence definitions.

10. The method of claim 1, wherein the recognition result selected for the natural language input is a preliminary recognition result that is selected before obtaining additional evidence from one of the evidence sources.

11. The method of claim 1, wherein the recognition result selected for the natural language input is a final recognition result selected for the natural language input received.

12. The method of claim 1, further comprising: triggering, by the natural language input recognizer, the response associated with the recognition result selected for the natural language input.

13. The method of claim 12, wherein triggering the response comprises comparing a response definition defined in a response model to the recognition result selected for the natural language input.

14. The method of claim 13, wherein triggering the response further comprises determining that an evidence definition defined in the response model is satisfied by the evidence obtained.

15. The method of claim 1, wherein obtaining the evidence from the evidence source comprises receiving, by the natural language input recognizer, a notification comprising the evidence from the evidence source.

16. The method of claim 1, wherein obtaining the evidence from the evidence source comprises querying, by the natural language input recognizer, the evidence source and receiving, by the natural language input recognizer, a response comprising the evidence from the evidence source.

17. The method of claim 1, wherein the natural language input interface is one of a speech input interface that receives the natural language input as speech input, a text input interface that receives the natural language input as text input, and a handwriting input interface that receives the natural language input as handwriting input.

18. The method of claim 1, wherein the evidence comprises at least one recognition hypothesis provided by an automatic speech recognition (ASR) engine.

19. The method of claim 18, wherein the ASR engine comprises at least one of a local ASR engine that resides locally at the computing device and a remote ASR engine that is located remotely relative to the computing device and is in signal communication with the computing device via a network.

20. The method of claim 1, wherein the evidence comprises at least one hypothesis provided by a natural language understanding (NLU) engine.

21. The method of claim 20, wherein the NLU engine comprises at least one of a local NLU engine that resides locally at the computing device and a remote NLU engine that is located remotely relative to the computing device and is in signal communication with the computing device via a network.

22. The method of claim 1, wherein the evidence comprises a current state of an application executing at the computing device.

23. The method of claim 1, wherein the evidence comprises a current state of a user that provided the natural language input.

24. The method of claim 1, wherein the evidence comprises at least one of i) a location, ii) a distance to a point-of-interest, iii) a date, and iv) a time of day.

25. The method of claim 1, wherein the evidence comprises a usage history stored at the computing device.

26. A device comprising:
a natural language input interface configured to receive natural language input and generate a digital signal corresponding to the natural language input; and
a natural language input recognizer configured to obtain evidence from an evidence source, generate an evidence graph based, at least in part, on the evidence obtained, wherein the evidence graph comprises a set of evidence nodes, wherein the set of evidence nodes comprises a set of one or more intent evidence nodes and a set of one or more phrase evidence nodes, and wherein at least one phrase evidence node is connected to at least one intent evidence node, generate a set of recognition hypotheses based, at least in part, on the evidence graph, and select a recognition hypothesis of the set of recognition hypotheses as a recognition result for the natural language input for triggering a response.

27. The device of claim 26, wherein the natural language input recognizer is configured to asynchronously obtain evidence from a plurality of evidence sources, and generate the set of recognition hypotheses by generating a first set of recognition hypotheses based on evidence obtained during a first timeframe, and generating a second set of recognition hypotheses based on evidence obtained during a second timeframe subsequent to the first timeframe.

28. The device of claim 27, wherein the natural language input recognizer is configured to generate the set of recognition hypotheses further by traversing a path of the evidence graph, and generating a recognition hypothesis based on the path traversed.

29. The device of claim 28, wherein the natural language input recognizer is further configured to:
generate a score for each one of the recognition hypotheses; and
wherein the recognition hypothesis is selected as the recognition result for the natural language input is selected based on the score.

30. The device of claim 29, wherein the natural language input recognizer is further configured to:
compare the score for each one of the recognition hypotheses to a score threshold; and
wherein the score of the recognition hypothesis is selected as the recognition result for the natural language input exceeding the score threshold.

31. The device of claim 26, wherein
the natural language input recognizer is configured to generate the evidence graph based on the evidence obtained.

32. The device of claim 31, further comprising:
wherein each intent evidence node comprises an intent hypothesis and an intent score for the intent hypothesis; and
wherein each phrase evidence node comprises a slot hypothesis and a slot score for the slot hypothesis.

33. The device of claim 31, wherein the natural language input recognizer is configured to generate the set of evidence nodes by comparing the evidence obtained to one or more evidence definitions defined in an evidence model and determine whether the evidence holds for the one or more evidence definitions.

34. The device of claim 26, wherein the natural language input recognizer is further configured to trigger the response associated with the recognition result selected for the natural language input.

35. The device of claim 34, wherein the natural language input recognizer is further configured to compare a response definition defined in a response model to the recognition result selected for the natural language input.

36. The device of claim 26, wherein the evidence source is a recognition engine configured to process the digital signal corresponding to the natural language input and provide a set of transcription recognition hypotheses or a set of semantic recognition hypotheses.

37. A computer program product comprising a non-transitory computer-readable medium having instructions stored therein that, when executed by a computing device, cause a computing device to perform operations comprising:
receiving natural language input;
obtaining evidence asynchronously from a plurality of evidence sources;
generating an evidence graph based on the evidence obtained, wherein the evidence graph comprises a set of evidence nodes, wherein the set of evidence nodes comprises a set of one or more intent evidence nodes and a set of one or more phrase evidence nodes, and wherein at least one phrase evidence node is connected to at least one intent evidence node;
traversing the evidence graph to generate a first set of recognition hypotheses based on the evidence obtained during a first timeframe and to generate a second set of recognition hypotheses based on the evidence obtained during a second timeframe subsequent to the first timeframe;
scoring each recognition hypothesis in the second set of recognition hypotheses;
selecting a recognition hypothesis of the second set of recognition hypotheses as a recognition result for the natural language input received based on a score associated with the one of the recognition hypotheses selected; and
triggering a response associated with the recognition result selected for the natural language input.

* * * * *